US012586797B2

(12) United States Patent
Aono et al.

(10) Patent No.: US 12,586,797 B2
(45) Date of Patent: Mar. 24, 2026

(54) SEPARATOR FOR FUEL CELL AND SINGLE CELL FOR FUEL CELL

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 684 days.

(21) Appl. No.: 17/962,107

(22) Filed: Oct. 7, 2022

(65) Prior Publication Data

US 2023/0118637 A1     Apr. 20, 2023

(30) Foreign Application Priority Data

Oct. 14, 2021     (JP) ................................. 2021-168827

(51) Int. Cl.
  H01M 8/026    (2016.01)
  H01M 8/0263   (2016.01)
  H01M 8/0273   (2016.01)
(52) U.S. Cl.
  CPC ......... H01M 8/026 (2013.01); H01M 8/0263 (2013.01); H01M 8/0273 (2013.01)
(58) Field of Classification Search
  None
  See application file for complete search history.

(56) References Cited

U.S. PATENT DOCUMENTS

| | | | | |
|---|---|---|---|---|
| 2005/0244699 A1* | 11/2005 | Shimoi | ............... | H01M 8/0247 |
| | | | | 429/514 |
| 2006/0234107 A1* | 10/2006 | Leger | .................. | H01M 8/0258 |
| | | | | 429/514 |
| 2009/0029228 A1* | 1/2009 | Shibata | ............... | H01M 8/0263 |
| | | | | 429/402 |
| 2019/0237775 A1 | 8/2019 | Shibata | | |
| 2019/0305327 A1* | 10/2019 | Okabe | ................. | H01M 8/0263 |
| 2021/0050604 A1 | 2/2021 | Li | | |

(Continued)

FOREIGN PATENT DOCUMENTS

| | | |
|---|---|---|
| CN | 110085885 A | 8/2019 |
| CN | 112397740 A | 2/2021 |
| JP | 2004-235063 A | 8/2004 |

(Continued)

OTHER PUBLICATIONS

Office Action in counterpart Japanese Patent Application No. 2021-168827, dated Mar. 11, 2025 (along with translation thereof).

(Continued)

*Primary Examiner* — Alix E Eggerding
(74) *Attorney, Agent, or Firm* — Greenblum & Bernstein, P.L.C.

(57)     ABSTRACT

A separator for a fuel cell includes a facing surface configured to face a power generating unit of the fuel cell. Groove passages are arranged side by side in the facing surface. Reactant gas flows through the groove passages. Ribs, which are located between the groove passages and protrude toward the power generating unit, are provided on the facing surface. At least one of the ribs includes at least one protrusion that protrudes toward the power generating unit.

12 Claims, 15 Drawing Sheets

(56) References Cited

U.S. PATENT DOCUMENTS

2021/0288340 A1* 9/2021 Nunokawa .......... H01M 8/0206
2022/0407087 A1 12/2022 Shinozaki et al.

FOREIGN PATENT DOCUMENTS

| | | | |
|---|---|---|---|
| JP | 2012-164532 | A | 8/2012 |
| JP | 2013-069541 | A | 4/2013 |
| JP | 2017-188346 | A | 10/2017 |
| JP | 2017-212218 | A | 11/2017 |
| WO | WO2021/131138 | A1 | 7/2021 |

OTHER PUBLICATIONS

Office Action in counterpart Chinese Patent Application No. 202211247029.0, dated Apr. 29, 2025 (and translation thereof).

* cited by examiner

SEPARATOR FOR FUEL CELL AND SINGLE CELL FOR FUEL CELL

BACKGROUND

1. Field

The present disclosure relates to a separator for a fuel cell and a single cell for a fuel cell.

2. Description of Related Art

Japanese Laid-Open Patent Publication No. 2017-188346 discloses a fuel cell. The fuel cell includes a membrane electrode gas diffusion layer assembly (hereinafter, referred to as MEGA) and a plastic frame member arranged at the outer periphery of the MEGA.

The fuel cell also includes an anode-side separator and a cathode-side separator, which hold, between them, the MEGA and the plastic frame member.

The MEGA includes a membrane electrode assembly (hereinafter referred to as MEA), an anode-side gas diffusion layer (hereafter referred to as GDL), and a cathode-side GDL. The anode-side GDL and the cathode-side GDL hold the MEA between them.

The separators each include groove passages, which supply oxidation gas or fuel gas (hereinafter referred to as reactant gas) to the MEGA, and ribs, which are located between the groove passages and contact the GDLs.

In this type of fuel cell, sections of a GDL adjacent to a separator that face groove passages may be deformed to bend and sink into the groove passages. The sunk sections of the GDL act as resistance to the flow of reactant gas through the groove passages and thus can increase a pressure loss of the reactant gas.

SUMMARY

Accordingly, it is an objective of the present disclosure to provide a separator for a fuel cell and a single cell for a fuel cell that restrict a gas diffusion layer from sinking into a groove passage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a separator for a fuel cell is provided. The separator includes a facing surface configured to face a power generating unit of the fuel cell. Groove passages through which a reactant gas flows are arranged side by side on the facing surface. Ribs, which are located between the groove passages and protrude toward the power generating unit, are provided on the facing surface. At least one of the ribs includes at least one protrusion that protrudes toward the power generating unit.

In another general aspect, a single cell for a fuel cell includes two separators and a power generating unit. The power generating unit is held between the two separators and includes two gas diffusion layers respectively contacting the two separators. At least one of the two separators is the above-described separator. The power generating unit is compressed by the protrusion in a facing direction in which the power generating unit and the separator face each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
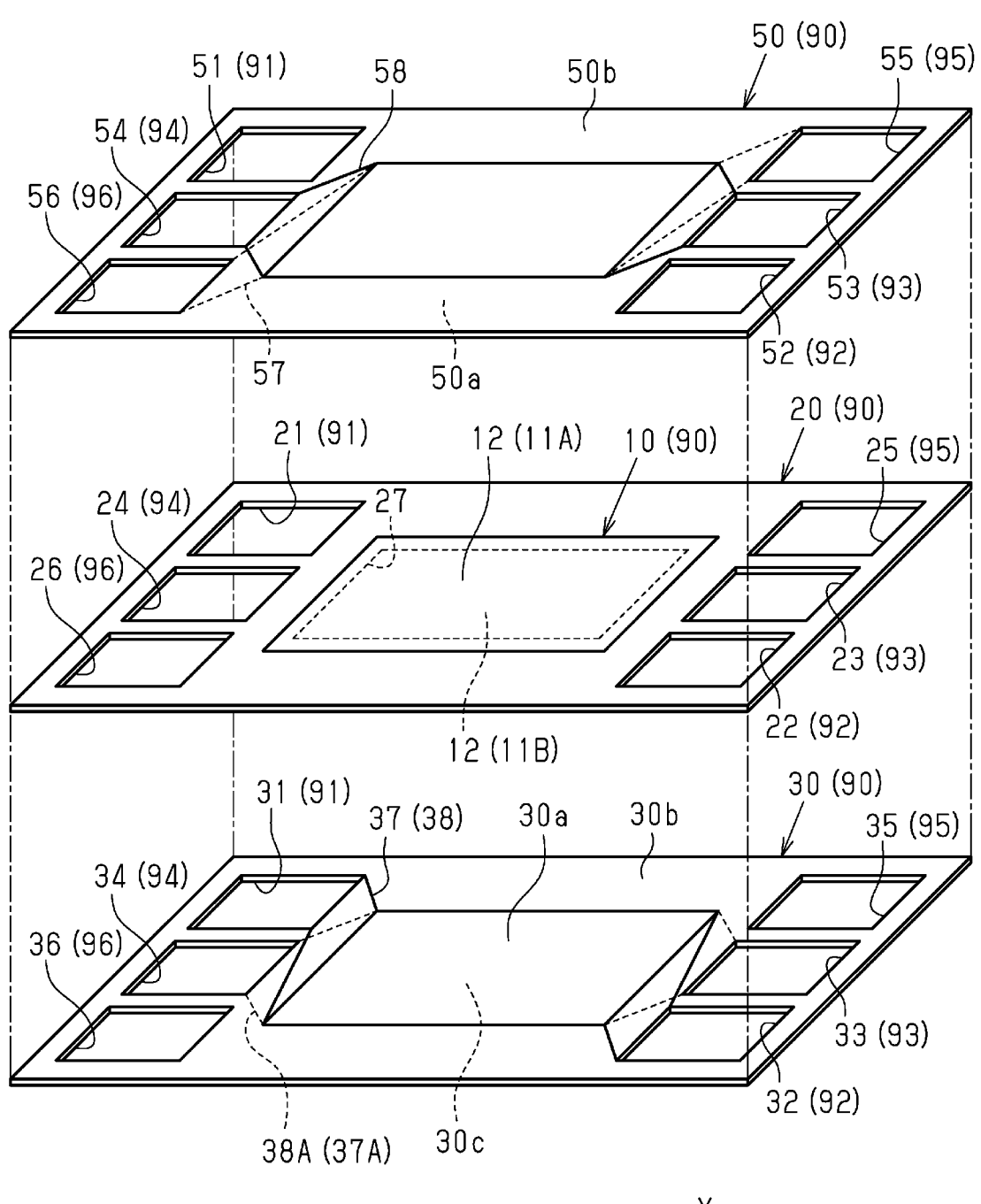
FIG. 1 is an exploded perspective view of a single cell for a fuel cell that includes separators for a fuel cell according to first to fourth embodiments.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Separators for fuel cells and single cells for fuel cells according to first to fourth embodiments will now be described with reference to FIGS. 1 to 22. For illustrative purposes, some parts of the structures in the drawings are exaggerated or simplified, and the dimensional ratios of the structures may be different from the actual ratios. The term "orthogonal" is not necessarily used in a strict sense, but may be used in cases where elements are generally orthogonal to each other within ranges in which such configuration achieves the operational advantages of the respective embodiments.

First Embodiment

Separators 30, 50 for a fuel cell and a single cell 90 for a fuel cell according to a first embodiment will be described with reference to FIGS. 1 to 6.

<Overall Configuration of Single Cell 90 of Fuel Cell>

As shown in FIG. 1, the single cell 90 for a fuel cell includes a membrane electrode assembly 10 (hereinafter, referred to as MEA 10), a frame member 20, which holds the MEA 10, and two separators 30, 50, which hold the MEA 10 and the frame member 20 between them.

The single cell 90 is a rectangular plate as a whole.

In the following description, the direction in which the separator 30, the layer including the MEA 10 and the frame member 20, and the separator 50 are stacked will be referred to as a first direction X.

A longitudinal direction of the single cell 90, which is orthogonal to the first direction X, will be referred to as a second direction Y.

Also, a direction that is orthogonal to both the first direction X and the second direction Y will be referred to as a third direction Z.

The single cell 90 has inlet holes 91, 93, 95 for introducing reactant gas or cooling medium into the single cell 90 and outlet holes 92, 94, 96 for discharging the reactant gas and the cooling medium in the single cell 90 to the outside. In the present embodiment, the inlet hole 91 and the outlet hole 92 are holes through which fuel gas flows. The inlet hole 93 and the outlet hole 94 are holes through which cooling medium flows. The inlet hole 95 and the outlet hole 96 are holes through which oxidant gas flows. The fuel gas is hydrogen gas. The cooling medium is water. The oxidant gas is air.

The inlet holes 91, 93, 95 and the outlet holes 92, 94, 96 each have a rectangular shape elongated in the second direction Y in plan view, and extend in the first direction X through the single cell 90. The inlet hole 91 and the outlet holes 94, 96 are located on one side in the second direction Y of the single cell 90 (on the left side in the left-right direction in FIG. 1). The inlet hole 91 and the outlet holes 94, 96 are arranged side by side in the third direction Z while being spaced apart from each other. The outlet hole 92 and the inlet holes 93, 95 are located on the other side in the second direction Y of the single cell 90 (on the right side in FIG. 1). The outlet hole 92 and the inlet holes 93, 95 are arranged side by side in the third direction Z while being spaced apart from each other.

Each component will now be described.

<MEA 10>

As shown in FIG. 1, the MEA 10 has a rectangular shape elongated in the second direction Y.

The MEA 10 includes a solid polymer electrolyte membrane (not shown; hereinafter referred to as an electrolyte membrane) and electrodes 11A, 11B respectively provided on opposite surfaces of the electrolyte membrane. In the present embodiment, the electrode that is joined to one side in the first direction X (the upper side in the up-down direction in FIG. 1) of the electrolyte membrane (not shown) is a cathode 11A. Also, the electrode joined to the other side in the first direction X (the lower side in the in FIG. 1) of the electrolyte membrane is an anode 11B.

The electrodes 11A, 11B each include a catalyst layer (not shown) joined to the electrolyte membrane and a gas diffusion layer 12 (hereinafter referred to as a GDL 12), which is joined to the catalyst layer.

The MEA 10 corresponds to a power generating unit of the fuel cell according to the present disclosure.

<Frame Member 20>

As shown in FIG. 1, the frame member 20 has a rectangular shape elongated in the second direction Y.

The frame member 20 is a sheet made of, for example, a plastic.

The frame member 20 includes through-holes 21, 22, 23, 24, 25, 26, which are respective parts of the holes 91, 92, 93, 94, 95, 96.

The frame member 20 includes an opening 27, which has a rectangular shape elongated in the second direction Y, in a center. The MEA 10 is joined to the edge of the opening 27 from one side in the first direction X (upper side as viewed in FIG. 1). That is, the frame member 20 is located at an outer periphery of the MEA 10.

<Separator 30>

Figure 2:
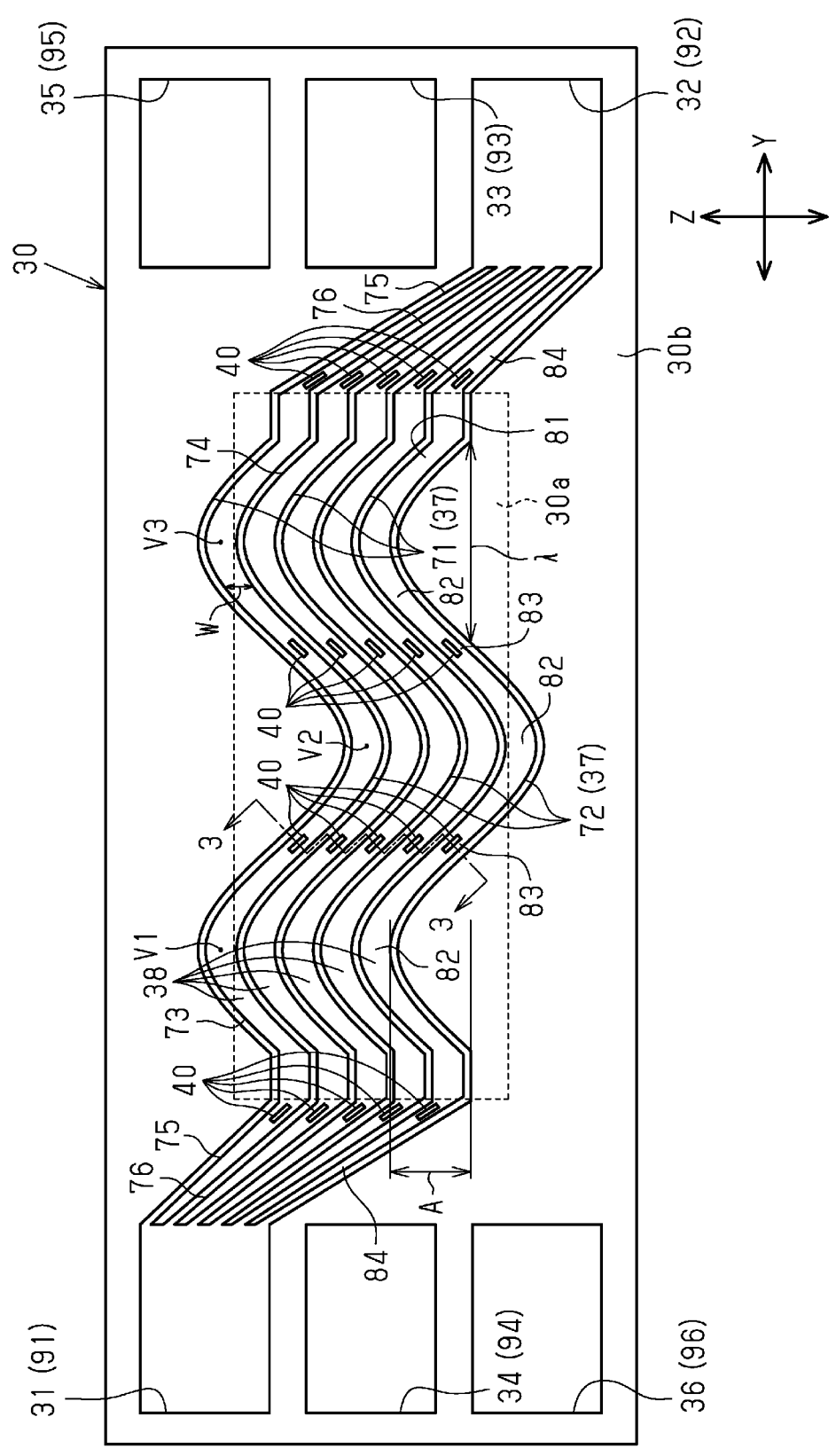
FIG. 2 is a plan view illustrating a separator according to the first embodiment.

As shown in FIGS. 1 and 2, the separator 30 is a rectangular plate elongated in the second direction Y.

The separator 30 is formed by pressing, for example, a metal member made of titanium or stainless steel.

The separator 30 is provided on the side of the MEA 10 on which the anode 11B is provided (refer to FIG. 1).

The separator 30 includes an inner facing surface 30a, which faces the MEA 10, and an outer facing surface 30b, which faces the frame member 20.

The separator 30 includes through-holes 31, 32, 33, 34, 35, 36, which are respective parts of the holes 91, 92, 93, 94, 95, 96. In the third direction Z, the through-holes 31, 34, 36 are provided at positions that correspond to the through-holes 21, 24, 26 of the frame member 20. Also, in the third direction Z, the through-holes 32, 33, 35 are provided at positions that correspond to the through-holes 22, 23, 25 of the frame member 20.

The separator 30 includes groove passages 37, through which fuel gas flows, and ribs 38 located between the groove passages 37. FIG. 1 illustrates, in a simplified manner, the outer edge of a section that includes the groove passages 37 and the ribs 38.

<Groove Passages 37>

As shown in FIG. 2, the groove passages 37 connect the through-hole 31 and the through-hole 32 to each other. In the present embodiment, the groove passages 37, of which there are six, are arranged side by side in the third direction Z while being spaced apart from each other.

The width, that is, the cross-sectional flow area of each groove passage 37 is constant over the entire groove passage 37 in the extending direction. The groove passages 37 have the same width.

The six groove passages 37 include three first groove passages 71 and three second groove passages 72. The first groove passages 71 and the second groove passages 72 alternate in the third direction Z.

Each first groove passage 71 includes a wavy section 73, which is provided on the inner facing surface 30a, and extending sections 75, which extend from the wavy section 73 into the outer facing surface 30b.

The wavy section 73 extends in a wavy shape in planar directions of the inner facing surface 30a. A wavelength λ, and an amplitude A of each wavy section 73 are constant over the entire wavy section 73 in the extending direction. The wavenumber of each wavy section 73 is three.

The extending sections 75 extend linearly toward the through-holes 31, 32 from opposite ends in the extending direction of the wavy section 73.

Each second groove passage 72 includes a wavy section 74, which is provided on the inner facing surface 30a, and extending sections 76, which extend from the wavy section 74 into the outer facing surface 30b. In the present embodiment, the wavy section 74 has the same waveform as the wavy section 73.

The extending sections 76 extend linearly toward the through-holes 31, 32 from opposite ends in the extending direction of the wavy section 74.

The outermost groove passages 37 in the third direction Z of the six groove passages 37 include sections that are located outside the outer edge of the inner facing surface 30a in the third direction Z.

<Ribs 38>

Figure 3:
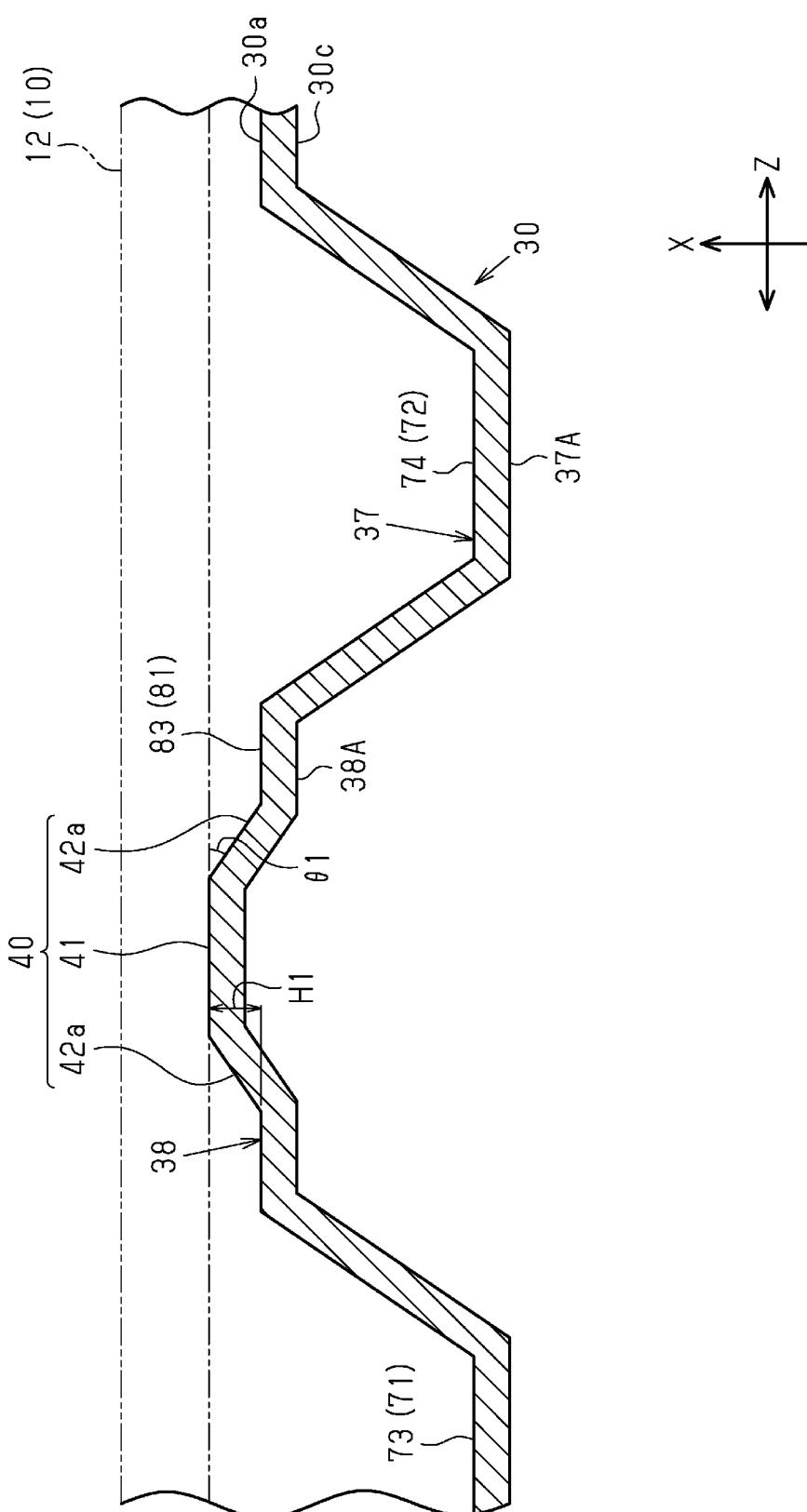
FIG. 3 is a cross-sectional view taken along line 3-3 of FIG. 2.

As shown in FIG. 3, the ribs 38 project toward one side in the first direction X (upward in the up-down direction as viewed in FIG. 3).

In the present embodiment, the ribs 38, of which there are five, are arranged side by side in the third direction Z while being spaced apart from each other, as shown in FIG. 2.

Each rib 38 includes a wavy section 81, which is provided on the inner facing surface 30a, and extending sections 84, which extend from the wavy section 81 into the outer facing surface 30b. In the present embodiment, the outermost wavy sections 81 in the third direction Z of the five wavy sections 81 include sections that are located outside the outer edge of the inner facing surface 30a.

Each wavy section 81 includes narrow sections 83 of which a width W in the third direction Z is less than other sections of the wavy section 81 (hereinbelow, referred to as general sections 82). In the present embodiment, the narrow sections 83 are located, in the extending direction of the wavy sections 81, between an apex V1 and an apex V2 of the wavy sections 81 and between the apex V2 and an apex V3 of the wavy sections 81.

As shown in FIGS. 2 and 3, each of the five ribs 38 includes protrusions 40, which protrude toward the MEA 10.

As shown in FIG. 3, each protrusion 40 includes a top surface 41, which extends in planar directions of the MEA 10, and two side surfaces 42a, which are bent and respectively extend from opposite ends in the third direction Z of the top surface 41.

A protruding amount H1 of the protrusions 40 is preferably within a range between 10 μm and 30 μm, inclusive. The protruding amount H1 is more preferably within a range between 20 μm and 30 μm, inclusive. In the present embodiment, the protruding amount H1 is set to be within the range between 20 μm and 30 μm, inclusive.

The two side surfaces 42a are inclined such that a given point on each side surface 42a separates further away from the top surface 41 in the third direction Z as that point separates away from the MEA 10 in the first direction X.

The inclination angle θ1 of the side surfaces 42a relative to the top surface 41 is preferably within a range between 1 degree and 5 degrees, inclusive. The inclination angle θ1 is more preferably within a range between 2 degrees and 5 degrees, inclusive. The inclination angle θ1 is further preferably within a range between 3 degrees and 5 degrees, inclusive. The inclination angle θ1 is further more preferably within a range between 4 degrees and 5 degrees, inclusive. In the present embodiment, the inclination angle θ1 is set to be within the range between 4 degrees and 5 degrees, inclusive.

As shown in FIG. 2, each rib 38 includes multiple protrusions 40. Specifically, the protrusions 40 of each rib 38 are provided at multiple positions (four positions in the present embodiment) in the extending direction of the rib 38. Two of the four protrusions 40 are provided in the wavy section 81 of the rib 38. Specifically, the protrusions 40 are respectively provided in the two narrow sections 83. The remaining two protrusions 40 are provided in the extending sections 84 of the rib 38. Specifically, the protrusions 40 are respectively provided in the extending section 84 that extends to the through-hole 31 and in the extending section 84 that extends to the through-hole 32.

<Groove Passages 38A, Ribs 37A>

As shown in FIGS. 1 and 3, the separator 30 includes a surface 30c on a side opposite to the facing surfaces 30a, 30b in the first direction X. Groove passages 38A, through which cooling medium flows, and ribs 37A located between the groove passages 38A are provided on the surface 30c. The ribs 37A are formed by the back surfaces of the groove passages 37. The groove passages 38A are formed by the back surfaces of the ribs 38. That is, the ribs 37A and the groove passages 38A are in a back-to-back relationship with the groove passages 37 and the ribs 38 on the facing surfaces 30a, 30b (refer to FIG. 3). FIG. 1 illustrates, in a simplified manner, the outer edge of a section that includes the groove passages 38A and the ribs 37A.

The groove passages 38A connect the through-hole 33 and the through-hole 34 to each other. In the groove passages 38A, cooling medium flows in a direction opposite to the flowing direction of the fuel gas flowing through the groove passages 37.

<Separator 50>

As shown in FIG. 1, the separator 50 is a rectangular plate elongated in the second direction Y.

The separator 50 is formed by pressing, for example, a metal member made of titanium or stainless steel.

The separator 50 is provided on the side of the MEA 10 on which the cathode 11A is provided. The separator 50 includes a first surface 50a and a second surface 50b, which is on a side opposite to the first surface 50a. The first surface 50a includes a facing surface, which faces the MEA 10.

The separator 50 includes through-holes 51, 52, 53, 54, 55, 56, which are respective parts of the holes 91, 92, 93, 94, 95, 96. In the third direction Z, the through-holes 51, 54, 56 are provided at positions that correspond to the through-holes 21, 24, 26 of the frame member 20. Also, in the third direction Z, the through-holes 52, 53, 55 are provided at positions that correspond to the through-holes 22, 23, 25 of the frame member 20.

As shown in FIG. 1, the separator 50 includes groove passages 57 through which oxidant gas flows and groove passages 58 through which cooling medium flows. FIG. 1 illustrates, in a simplified manner, the outer edge of a portion in the separator 50 that includes the groove passages 57 and the outer edge of a portion in the separator 50 that includes the groove passages 58.

The groove passages 57 connect the through-hole 55 and the through-hole 56 to each other. In the groove passages 57, the oxidant gas flows in a direction opposite to the flow direction of the fuel gas flowing through the groove passages 37.

The groove passages 58 connect the through-hole 53 and the through-hole 54 to each other. In the groove passages 58, the cooling medium flows in the same direction as the flow direction of the oxidant gas flowing through the groove passages 57.

Operation of the first embodiment will now be described.

Figure 4:
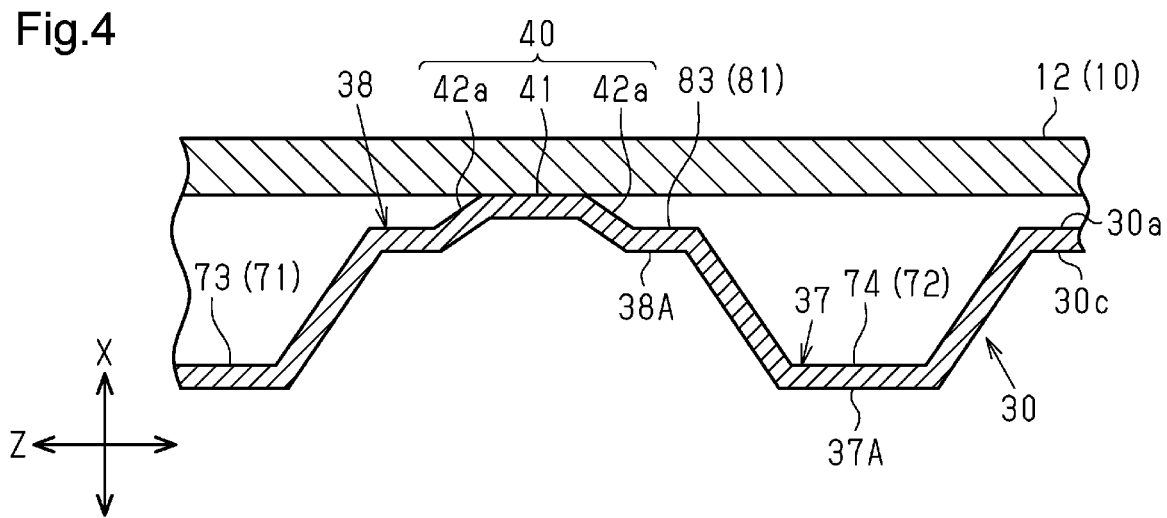
FIG. 4 is a cross-sectional view illustrating a state in which a power generating unit is stacked on a separator according to the first embodiment.
Figure 5:
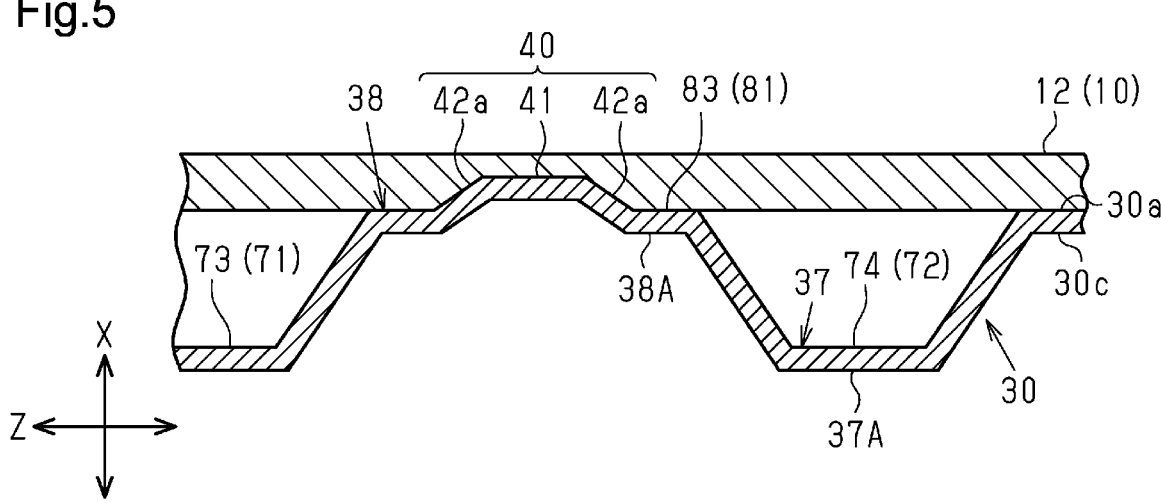
FIG. 5 is a cross-sectional view illustrating a GDL compressed by a protrusion of a rib.

As shown in FIGS. 4 and 5, when the separator 30 and the layer including the MEA 10 and the frame member 20 are stacked together to produce the single cell 90 for a fuel cell, the sections of the GDL 12 that contact the protrusions 40 are compressed in the inner facing surface 30a of the separator 30. Accordingly, the sections of the GDL 12 that face the groove passages 37 are in a taut state. FIGS. 4 and 5 illustrate only the GDL 12 in the MEA 10.

Figure 6:
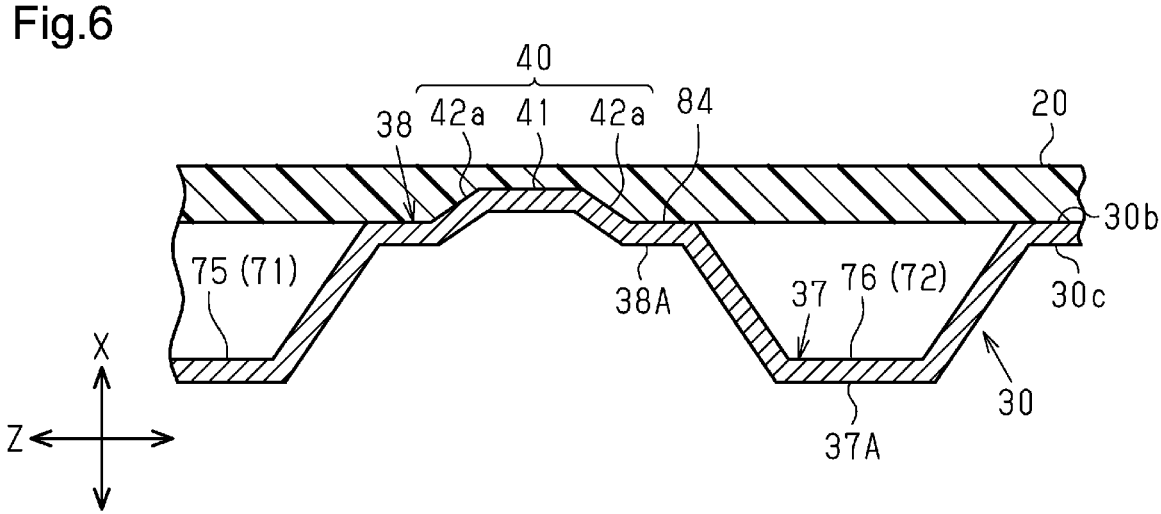
FIG. 6 is a cross-sectional view illustrating a frame member compressed by a protrusion of a rib.

On the other hand, the sections of the frame member 20 that contact the protrusions 40 are compressed in the outer facing surface 30b of the separator 30 as shown in FIG. 6. Accordingly, the sections of the frame member 20 that face the groove passages 37 are in a taut state.

The first embodiment has the following advantages.

(1-1) The separator 30 includes the inner facing surface 30a, which is configured to face the MEA 10 of the fuel cell. The ribs 38, which are located between the groove passages 37 and protrude toward the MEA 10, are provided on the inner facing surface 30a. Each rib 38 includes the protrusions 40, which protrude toward the MEA 10.

This configuration operates in the above-described manner. The GDL 12 is thus restricted from sinking into the groove passages 37.

(1-2) Each protrusion 40 includes a top surface 41, which extends in planar directions of the MEA 10, and two side surfaces 42a, which are bent and respectively extend from opposite ends in the third direction Z of the top surface 41. The two side surfaces 42a are inclined such that a given point on each side surface 42a separates further away from the top surface 41 in the third direction Z as that point separates away from the MEA 10 in the first direction X.

This configuration causes the GDL 12 to sink into groove passages 37 along the pairs of the side surfaces 42a, so that the sections of the GDL 12 that face the protrusions 40 are likely to be compressed. Accordingly, the sections of the GDL 12 that face the groove passages 37 are likely to be taut. The GDL 12 is thus further effectively restricted from sinking into the groove passages 37.

(1-3) The protruding amount H1 of the protrusions 40 is within the range between 20 μm and 30 μm, inclusive. The inclination angle θ1 of the side surfaces 42a relative to the top surface 41 is within the range between 4 degrees and 5 degrees, inclusive.

This configuration reliably restricts a clearance from being created between the side surfaces 42a of each protrusion 40 and GDL 12 while achieving the advantage of item (1-2) in a favorable manner.

(1-4) The protrusions 40 are provided on the inner facing surface 30a at multiple positions in the extending direction of the ribs 38.

This configuration achieves the operational advantage of item (1-1) at multiple positions in the extending direction of the ribs 38. The GDL 12 is thus further effectively restricted from sinking into the groove passages 37.

(1-5) The groove passages 37 include the first groove passages 71 and the second groove passages 72. The first groove passages 71 and the second groove passages 72 extend in wavy shapes in planar directions of the inner facing surface 30a and are adjacent to each other in the third direction Z. The ribs 38 include the wavy sections 81 located between the first groove passages 71 and the second groove passages 72. Each wavy section 81 includes the narrow sections 83, of which the width W in the third direction Z is less than the general sections 82 of the wavy section 81. The protrusions 40 are provided in the narrow sections 83.

The GDL 12 is more likely to sink into the groove passages 37 as the width W in the third direction Z of the ribs 38 adjacent to the groove passages 37 decreases. In this regard, the above-described configuration includes the protrusions 40 in the narrow sections 83 of the ribs 38. This allows the GDL 12 to be in a taut state in the sections of the first groove passages 71 and the second groove passages 72 that are adjacent to the narrow sections 83, that is, in sections in which the GDL 12 is likely to sink into the groove passages 37. The GDL 12 is thus restricted from sinking into the groove passages 37.

According to the above-described configuration, the separator 30 includes the first groove passages 71 and the second groove passages 72, which extend in wavy shapes. Thus, as compared to a case in which the groove passages 37 of the separator 30 extend linearly in planar directions of the inner facing surface 30a, the separator 30 of a single cell 90 and the separator 50 of another single cell 90 contact each other in a large area when the single cells 90 are stacked together. This increases the stability of the contacting structure of the adjacent separators 30, 50 and thus increases the stability of the contacting structure of the single cells 90.

(1-6) The protrusions 40 are respectively provided in the multiple ribs 38.

With this configuration, the GDL 12 is restricted from sinking into each of the multiple groove passages 37.

(1-7) The separator 30 includes the outer facing surface 30b, which faces the frame member 20. The groove passages 37 include the extending sections 75, 76, which extend into the outer facing surface 30b. The ribs 38 include the extending sections 84, which extend into the outer facing surface 30b. The protrusions 40 are also provided in the extending sections 84 of the ribs 38.

In the fuel cell, the MEA 10 is held by the frame member 20, which is located at the outer periphery of the MEA 10. If the frame member 20 is made of a plastic, the sections of the frame member 20 that face the groove passages 37 may be deformed to bend and sink into the groove passages 37. Like the GDL 12, the sunk frame member 20 acts as resistance to the flow of fuel gas through the groove passages 37 and thus can increase a pressure loss of the fuel gas.

In this regard, the above-described configuration functions in the above-described manner and thus restrict the frame member 20 from sinking into the groove passages 37.

Second Embodiment

A separator 30 for a fuel cell according to a second embodiment will now be described with reference to FIGS.

7 and 11. Thus, the same or corresponding components as those in the first embodiment are given the same reference numerals, and detailed explanations are omitted in the second embodiment.

Figure 7:
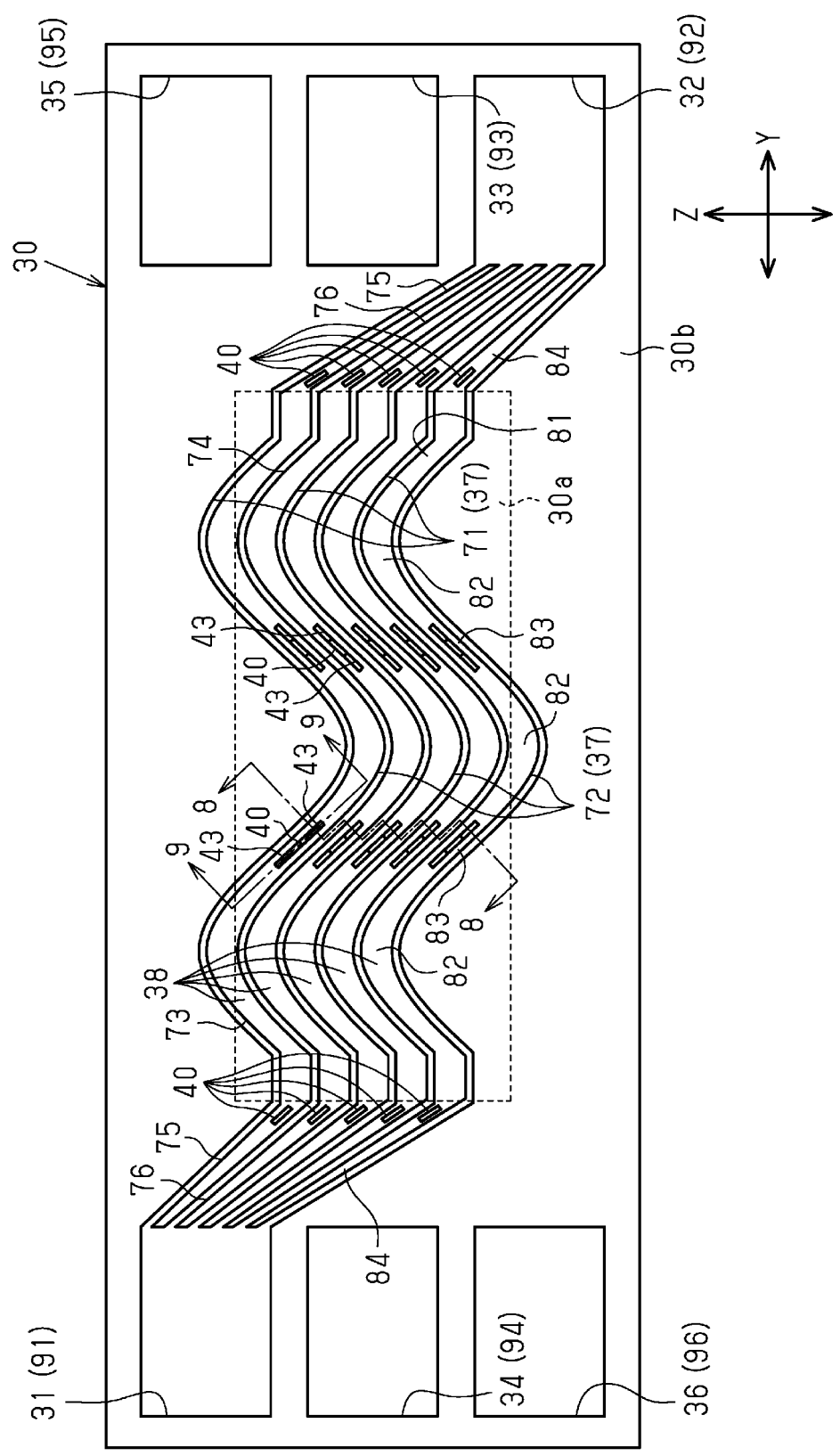
FIG. 7 is a plan view illustrating a separator according to the second embodiment.

As shown in FIG. 7, each of the five ribs 38 includes protrusions 40, which protrude toward the MEA 10.

Figure 9:
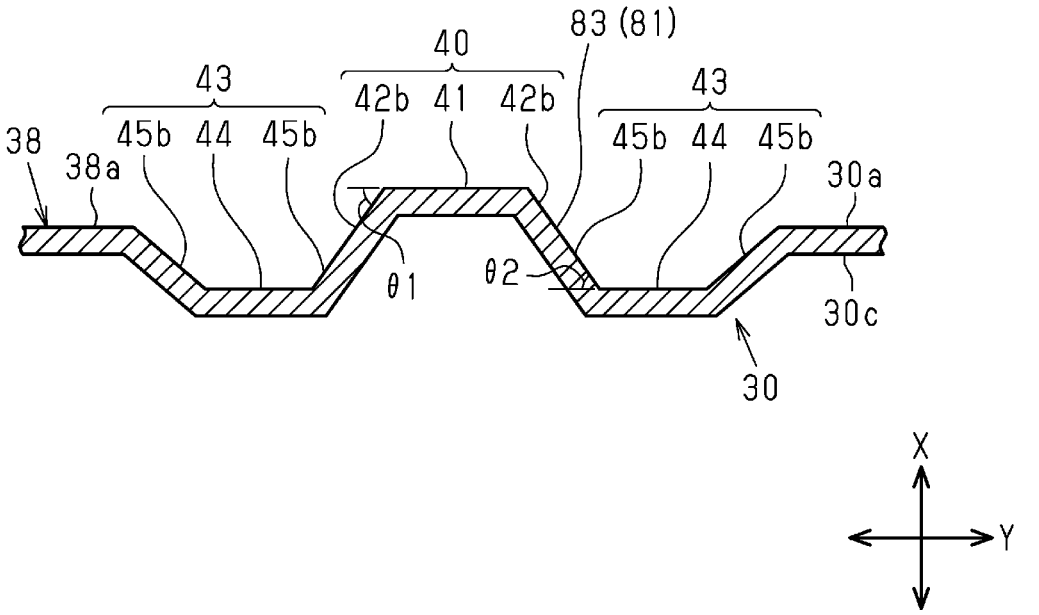
FIG. 9 is a cross-sectional view taken along line 9-9 of FIG. 7.

As shown in FIG. 9, each protrusion 40 includes two side surfaces 42*a*, which are bent and respectively extend from opposite ends of the top surface 41 in the extending direction of the rib 38. In the present embodiment, the inclination angle of each side surface 42*b* with respect to the top surface 41 is equal to the inclination angle θ1 of the first embodiment.

Figure 8:
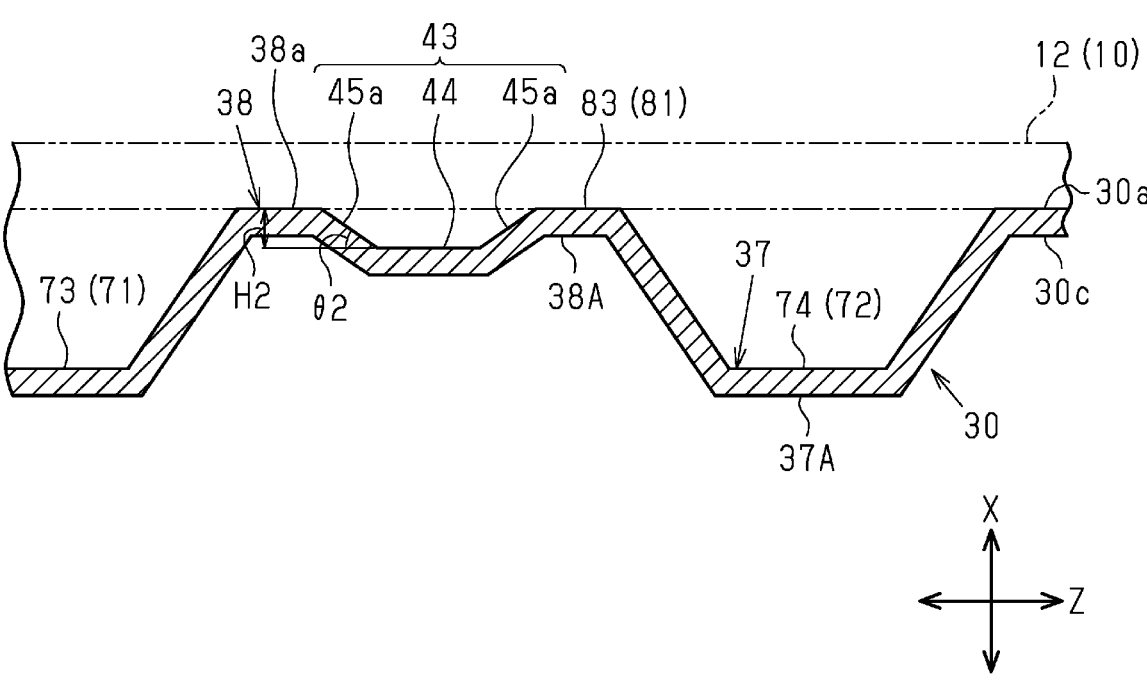
FIG. 8 is a cross-sectional view taken along line 8-8 of FIG. 7.

As shown in FIGS. 7 and 8, the wavy section 81 of each of the five ribs 38 includes recesses 43, which open toward the MEA 10. The recesses 43 are each provided in a center of the rib 38 in the third direction Z.

As shown in FIG. 8, each recess 43 includes a bottom surface 44, which extends in planar directions of the MEA 10 and faces the MEA 10, and two inner side surfaces 45*a*, which extend from opposite ends in the third direction Z of the bottom surface 44. Also, each recess 43 includes two inner side surfaces 45*b* in the extending direction of the wavy section 81. The two inner side surfaces 45*b* extend from the bottom surface 44 (refer to FIG. 9).

Each rib 38 includes general surfaces 38*a*, in which neither the protrusion 40 nor the recess 43 is provided. A protruding amount H2 from the bottom surface 44 to the general surfaces 38*a* is preferably within a range between 10 μm and 30 μm, inclusive. The protruding amount H2 is more preferably within a range between 20 μm and 30 μm, inclusive. In the present embodiment, the protruding amount H2 is set to be within the range between 20 μm and 30 μm, inclusive.

The two inner side surfaces 45*a* are inclined such that a given point on each inner side surface 45*a* separates further away from the bottom surface 44 in the third direction Z as that point approaches the MEA 10 in the first direction X.

The inclination angle θ2 of the inner side surfaces 45*a* relative to the bottom surface 44 is preferably within a range between 1 degree and 5 degrees, inclusive. The inclination angle θ2 is more preferably within a range between 2 degrees and 5 degrees, inclusive. The inclination angle θ2 is further preferably within a range between 3 degrees and 5 degrees, inclusive. The inclination angle θ2 is further more preferably within a range between 4 degrees and 5 degrees, inclusive. In the present embodiment, the inclination angle θ2 is set to be within the range between 4 degrees and 5 degrees, inclusive.

As shown in FIG. 9, the inclination angle of each inner side surface 45*b* with respect to the bottom surface 44 is equal to the inclination angle θ2.

As shown in FIGS. 7 and 9, each wavy section 81 includes multiple (four in the present embodiment) recesses 43. Specifically, the recesses 43 in each wavy section 81 are provided at positions that do not overlap with the protrusions 40 in the extending direction of the wavy section 81. More specifically, the recesses 43 are respectively provided on the opposite sides of each protrusion 40 in the extending direction. In the present embodiment, the recesses 43 are arranged such that the inner side surfaces 45*b* are continuous with the side surfaces 42*b* of the protrusions 40.

Operation of the second embodiment will now be described.

Figure 10:
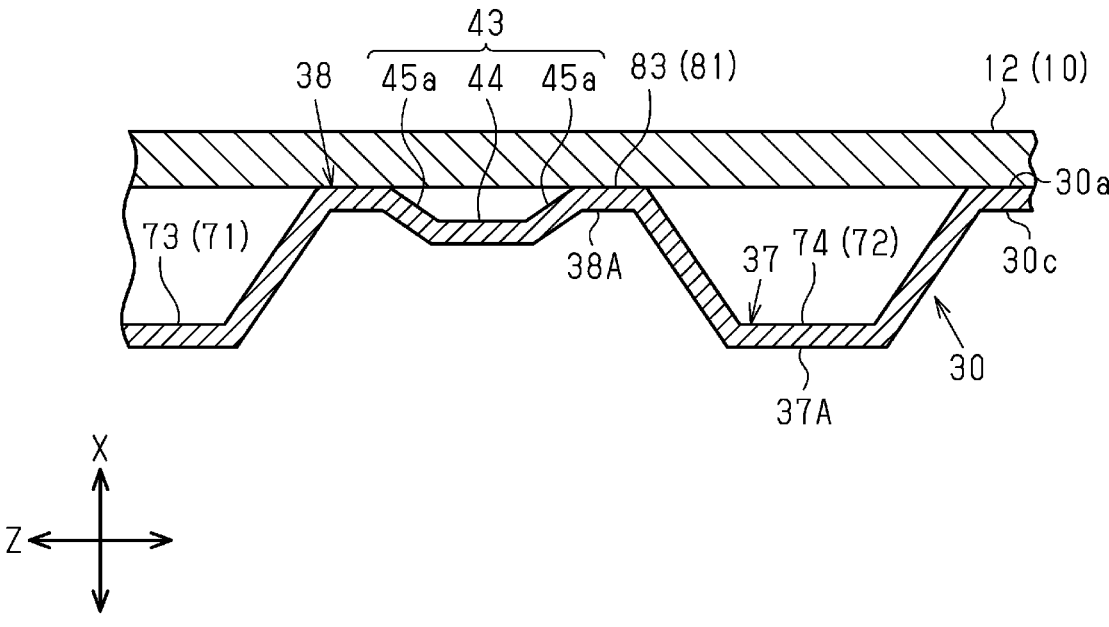
FIG. 10 is a cross-sectional view corresponding to FIG. 4, illustrating the second embodiment.
Figure 11:
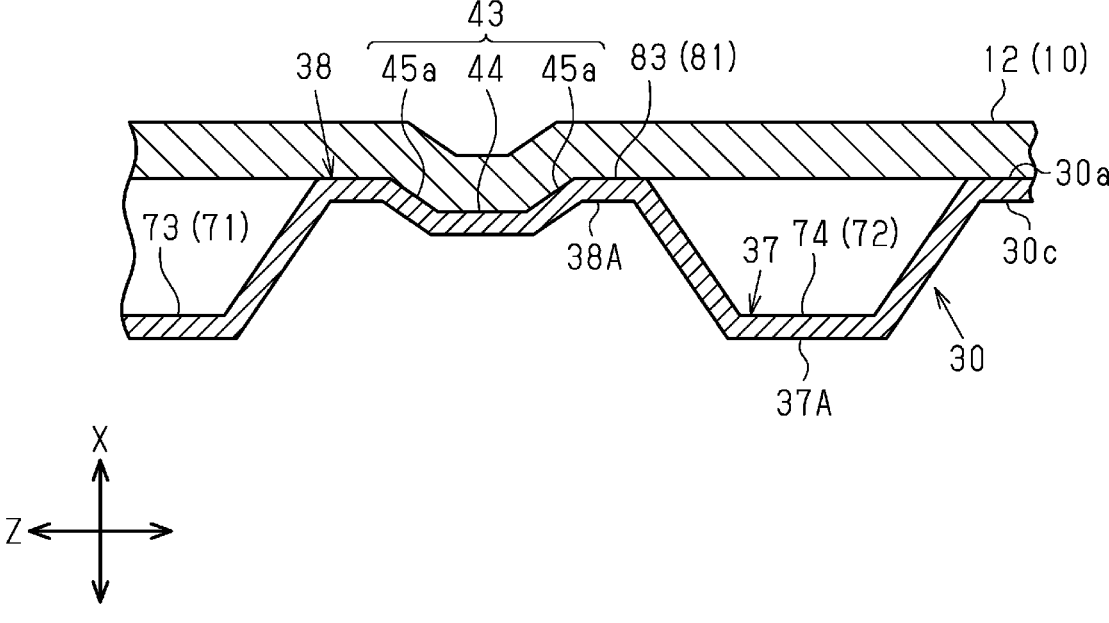
FIG. 11 is a cross-sectional view illustrating a GDL sinking into a recess of a rib.

As shown in FIGS. 10 and 11, when the separator 30 and the layer including the MEA 10 and the frame member 20 are stacked together to produce the single cell 90 for a fuel cell, the GDL 12 sinks into the recesses 43 along the pairs of the inner side surfaces 45*a* in the inner facing surface 30*a* of the separator 30. Also, the GDL 12 comes into contact with the bottom surfaces 44 of the recesses 43. The sections of the GDL 12 that contact the protrusions 40 are compressed (refer to FIGS. 4 and 5). As a result, the sections of the GDL 12 that face the groove passages 37 are in a taut state. FIGS. 10 and 11 illustrate only the GDL 12 in the MEA 10.

The second embodiment has the following advantages.

(2-1) Each rib 38 includes the recesses 43 in the center of the rib 38 in the third direction Z. Each recess 43 includes the bottom surface 44, which extends in planar directions of the MEA 10 and faces the MEA 10, and the two inner side surfaces 45*a*, which extend from the opposite ends in the third direction Z of the bottom surface 44. The two inner side surfaces 45*a* are inclined such that a given point on each inner side surface 45*a* separates further away from the bottom surface 44 in the third direction Z as that point approaches the MEA 10 in the first direction X. The recesses 43 are provided at positions that do not overlap with the protrusions 40 in the extending direction of the ribs 38.

This configuration operates in the above-described manner. The GDL 12 is thus further effectively restricted from sinking into the groove passages 37.

Third Embodiment

A separator 30 for a fuel cell according to a third embodiment will now be described with reference to FIGS. 12 to 16. Reference numerals 1, which are obtained by adding 100 to the reference numerals  in the first embodiment, to components of the separator 30 according to the third embodiment that are equivalent to those in the protrusions 40 according to the first embodiment, and redundant explanations are omitted. Regarding the other components in the third embodiment, the same reference numerals are given to those components that are the same as the corresponding components of the first embodiment, and redundant explanations are omitted.

Figure 12:
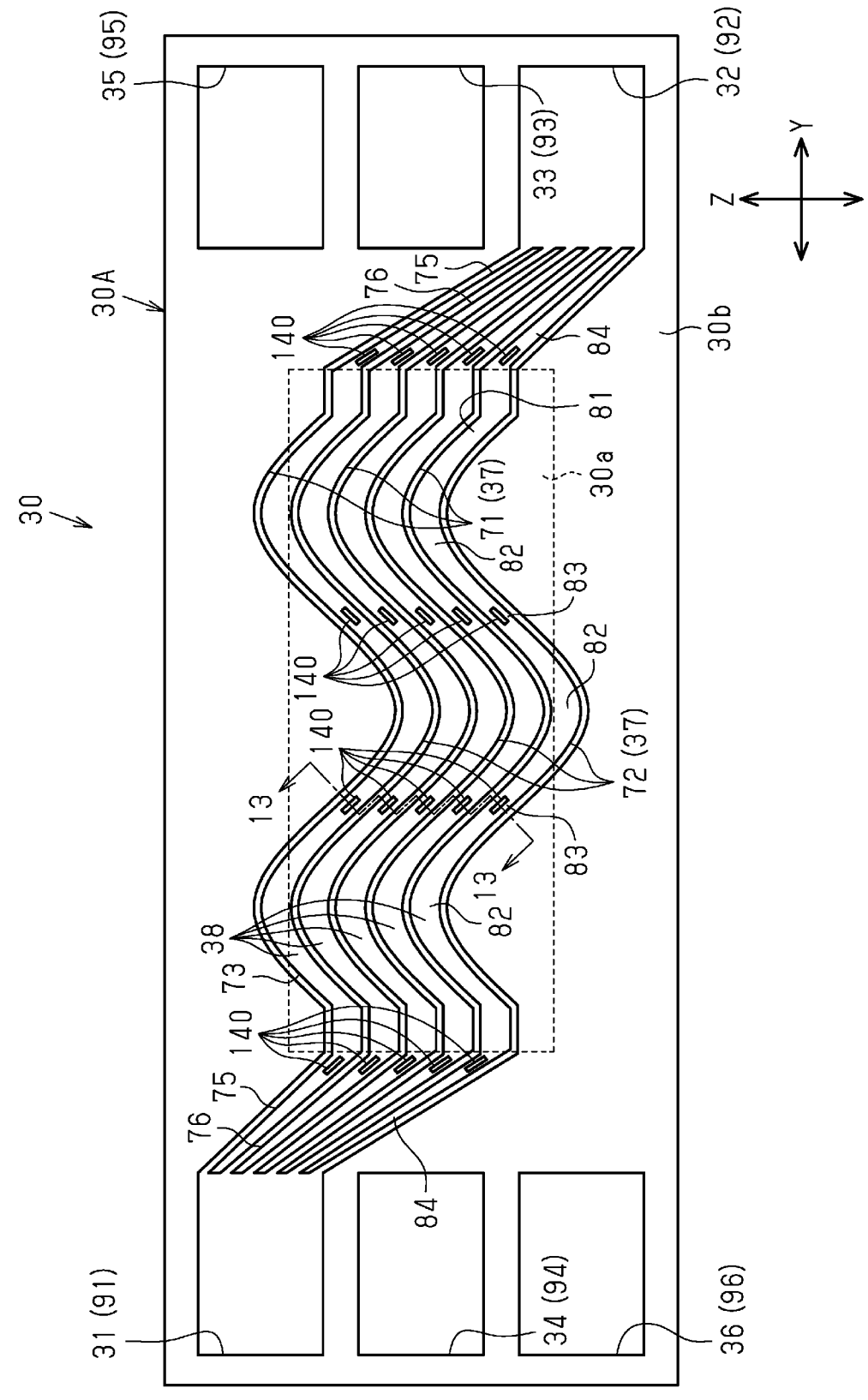
FIG. 12 is a plan view illustrating a separator according to a third embodiment.

As shown in FIG. 12, the separator 30 includes a base member 30A, which includes a main body of the separator 30, and contact members 140, which are formed separately from the base member 30A.

<Base Member 30A>

The base member 30A is formed by pressing, for example, a metal member made of titanium or stainless steel.

The base member 30A includes multiple (six in the present embodiment) groove passages 37, through which fuel gas flows, and multiple (five in the present embodiment) ribs 38 located between the groove passages 37.

<Contact Members 140>

Figure 13:
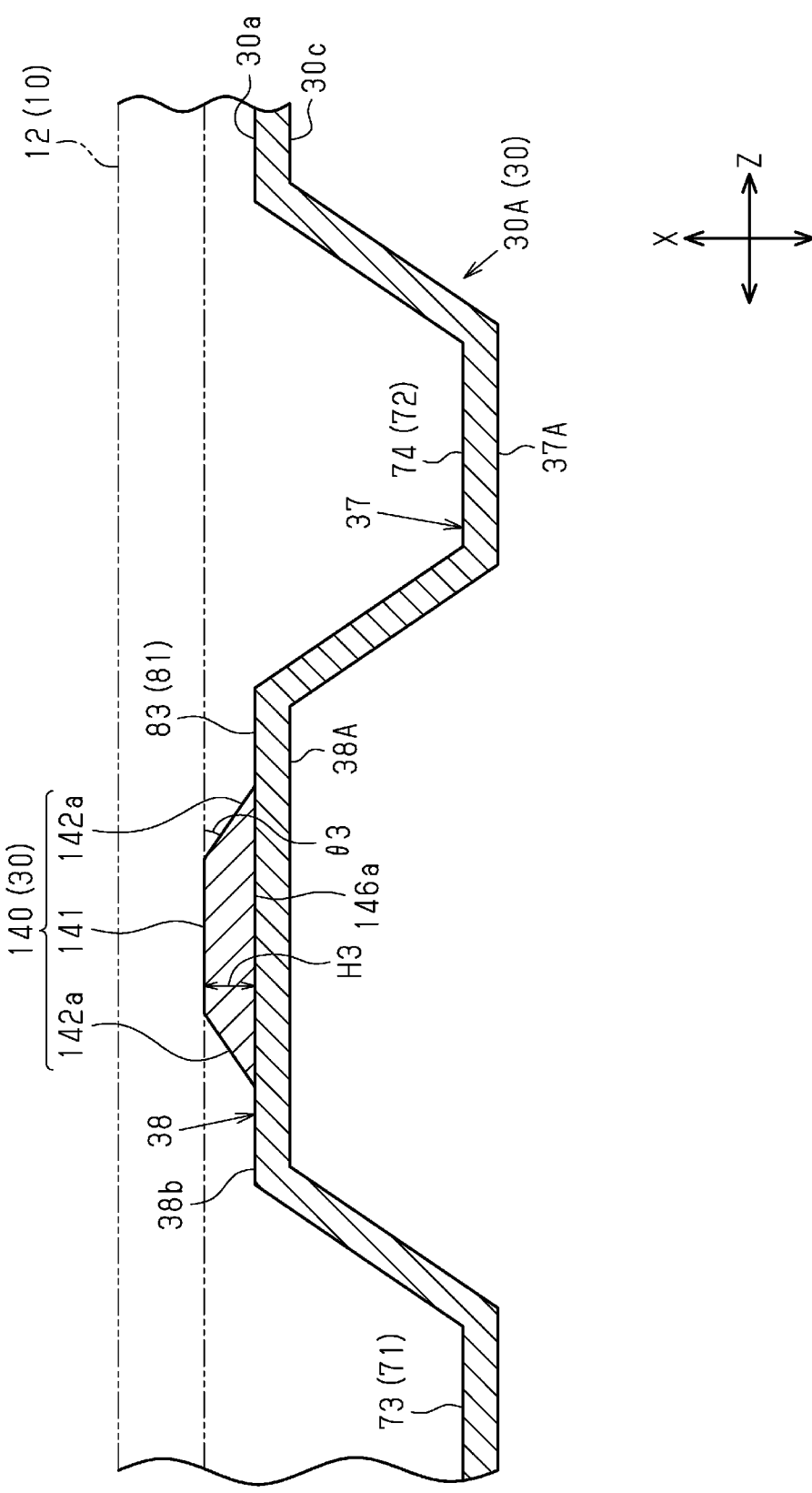
FIG. 13 is a cross-sectional view taken along line 13-13 of FIG. 12.

As shown in FIGS. 12 and 13, each contact member 140 is configured to contact the GDL 12 of the MEA 10 and is made of a conductive material different from that of the base member 30A. Specifically, the contact member 140 is made of a conductive material that includes a binder that is a thermosetting resin such as an epoxy resin and conductive particles such as carbon particles.

The contact members 140 are respectively joined to the five ribs 38 and protrude toward the MEA 10.

Each contact member 140 includes a top surface 141, which extends in planar directions of the MEA 10, and two side surfaces 142*a*, which are bent and respectively extend from opposite ends in the third direction Z of the top surface 141. Also, each contact member 140 includes a joint surface 146a. The joint surface 146a is located on a side opposite to the top surface 141 in the first direction X and is joined to the distal surface 38b of the corresponding rib 38.

A protruding amount H3 of the contact members 140 is preferably set in the same manner as the protruding amount H1 of the protrusions 40 in the first embodiment (refer to FIG. 3). In the present embodiment, the protruding amount H3 is set to be within the range between 20 µm and 30 µm, inclusive.

An inclination angle θ3 of each side surface 142a with respect to the top surface 141 is preferably set in the same manner as the inclination angle θ1 of each side surface 42a with respect to the top surface 41 according to the first embodiment (refer to FIG. 3). In the present embodiment, the inclination angle θ3 is set to be within the range between 4 degrees and 5 degrees, inclusive.

Each contact member 140 is fixed to the base member 30A by bonding opposite ends of the joint surface 146a in the third direction Z to the distal surface 38b of the corresponding rib 38 with an adhesive (not shown).

As shown in FIG. 12, each rib 38 includes multiple contact members 140. Specifically, the contact members 140 of each rib 38 are provided at multiple positions (four positions in the present embodiment) in the extending direction of the rib 38. Two of the four contact members 140 are bonded to the wavy section 81 of the rib 38. Specifically, the contact members 140 are respectively provided in the two narrow sections 83. The remaining two of the contact members 140 are bonded to the extending sections 84 of the rib 38. Specifically, the contact members 140 are respectively bonded to the extending section 84 that extends to the through-hole 31 and the extending section 84 that extends to the through-hole 32.

Operation of the third embodiment will now be described.

Figure 14:
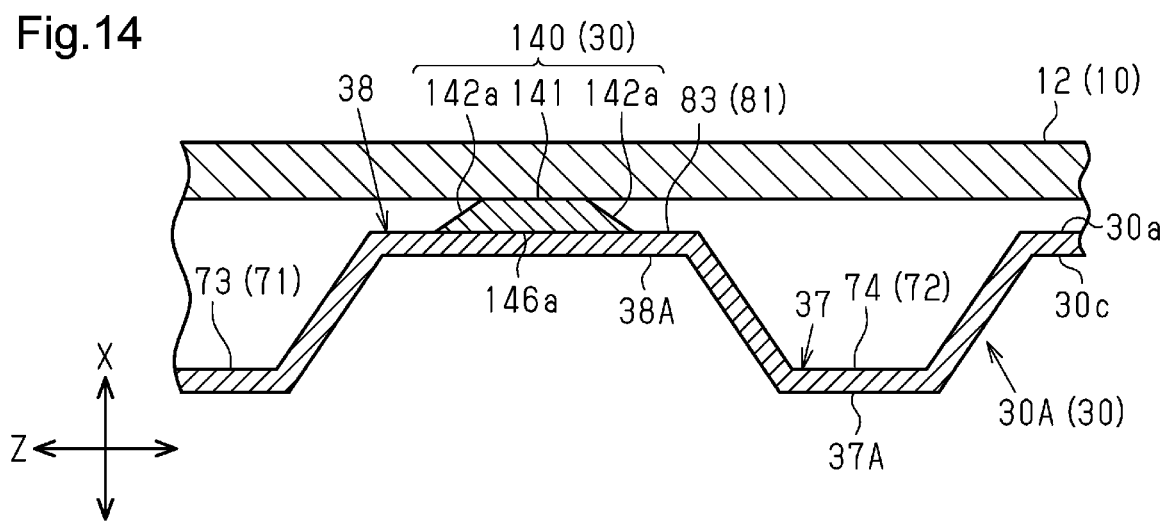
FIG. 14 is a cross-sectional view corresponding to FIG. 4, illustrating the third embodiment.
Figure 15:
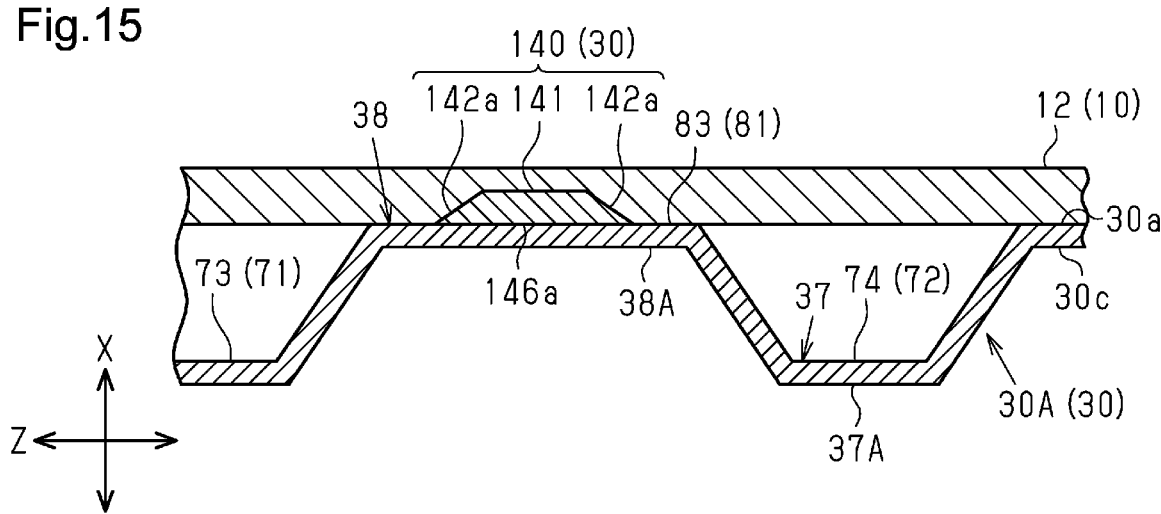
FIG. 15 is a cross-sectional view illustrating a GDL compressed by a contact member.
Figure 16:
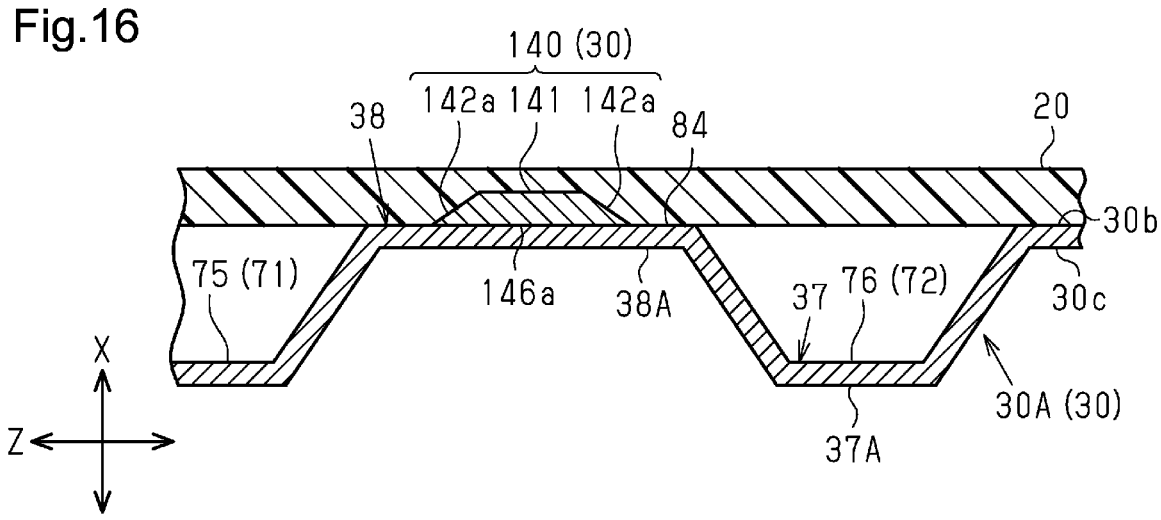
FIG. 16 is a cross-sectional view illustrating a frame member compressed by a contact member.

As shown in FIGS. 14 to 16, when the separator 30 and the layer including the MEA 10 and the frame member 20 are stacked together to produce the single cell 90 for a fuel cell, the sections of the GDL 12 that contact the contact members 140 are compressed in the inner facing surface 30a of the separator 30. Accordingly, the sections of the GDL 12 that face the groove passages 37 are in a taut state. FIGS. 14 and 15 illustrate only the GDL 12 in the MEA 10.

The sections of the frame member 20 that face the contact members 140 are compressed in the outer facing surface 30b of the separator 30 as shown in FIG. 16. Accordingly, the sections of the frame member 20 that face the groove passages 37 are in a taut state.

The third embodiment has the following advantages.

(3-1) The separator 30 includes the base member 30A, which has the groove passages 37 and the ribs 38, and the contact members 140, which are joined to the base member 30A and contact the MEA 10. The contact members 140 protrude toward the MEA 10.

This configuration achieves operational advantages similar to those of the first embodiment by simply employing the contact members 140 with the base member 30A of the existing separator 30. Accordingly, the shape of the base member 30A of the separator 30 is prevented from being complicated. Formation of the base member 30A is thus prevented from being difficult.

Fourth Embodiment

A separator 30 for a fuel cell according to a fourth embodiment will now be described with reference to FIGS. 17 to 22. Reference numerals 2, which are obtained by adding 200 to the reference numerals  in the first and second embodiments, to components of the separator 30 according to the fourth embodiment that are equivalent to the protrusions 40 according to the first embodiment and the recesses 43 according to the second embodiment, and redundant explanations are omitted. Regarding the other components in the fourth embodiment, the same reference numerals are given to those components that are the same as the corresponding components of the first and third embodiments, and redundant explanations are omitted.

Figure 17:
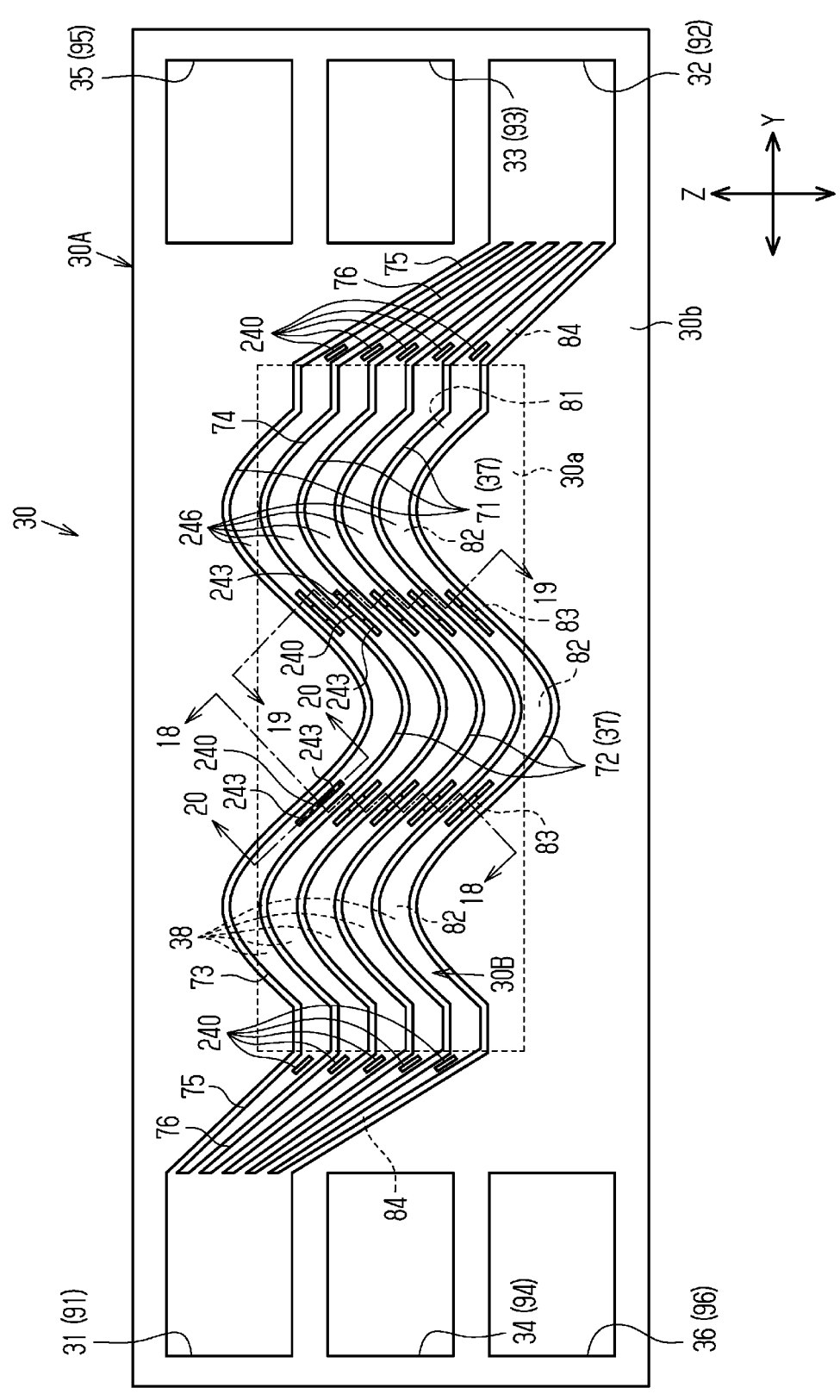
FIG. 17 is a plan view illustrating a separator according to a fourth embodiment.
Figure 18:
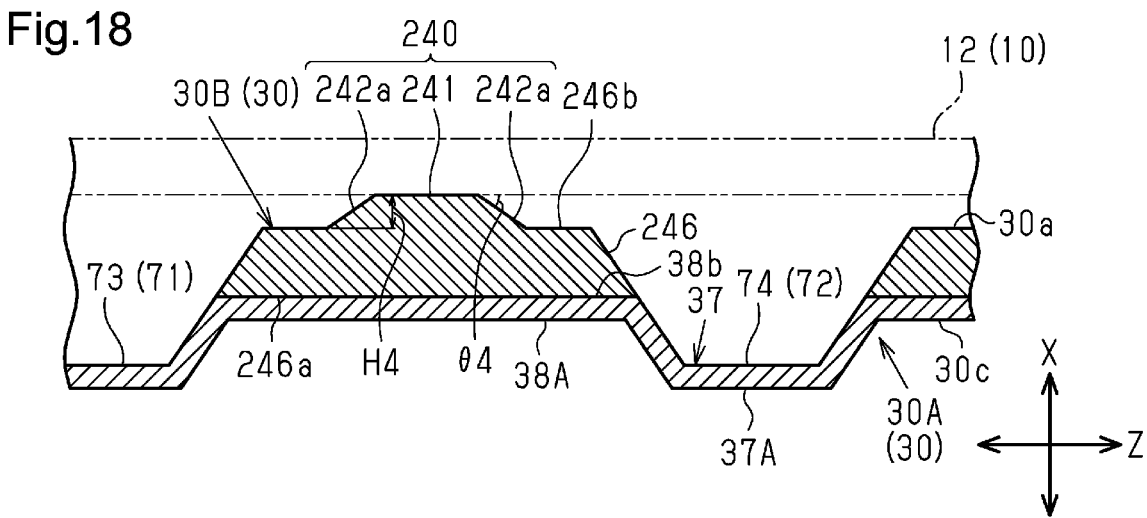
FIG. 18 is a cross-sectional view taken along line 18-18 of FIG. 17.
Figure 19:
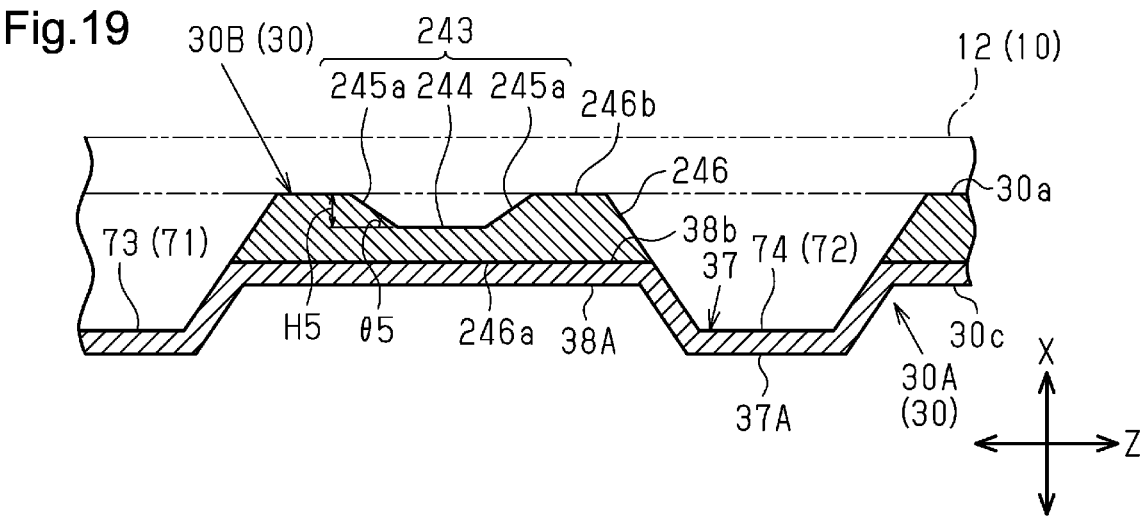
FIG. 19 is a cross-sectional view taken along line 19-19 of FIG. 17.

As shown in FIGS. 17 to 19, the separator 30 includes a base member 30A, which includes a main body of the separator 30, and contact members 30B, which are formed separately from the base member 30A. In the present embodiment, the protruding amount of the ribs 38 of the base member 30A in the first direction X is smaller than that in the third embodiment (refer to FIGS. 13 and 18).

<Contact Members 30B>

As shown in FIGS. 17 to 19, the contact members 30B are configured to contact the GDL 12 of the MEA 10 and are made of the same conductive material as that of the contact members 140 according to the third embodiment.

The contact members 30B are respectively joined to the five ribs 38.

Each contact member 30B includes a base portion 246, which is joined to the corresponding rib 38, a protrusion 240, which protrudes from the base portion 246, and a recess 243, which opens toward the MEA 10.

As shown in FIGS. 18 and 19, the base portion 246 includes a joint surface 246a. The joint surface 246a is located on a side opposite to the protrusion 240 and the recess 243 in the first direction X and is joined to the distal surface 38b of the rib 38.

The base portion 246 covers the whole distal surface 38b of the rib 38 in the third direction Z. Each contact member 30B is fixed to the base member 30A by bonding opposite ends of the joint surface 246a in the third direction Z to the distal surface 38b of the corresponding rib 38 with an adhesive (not shown).

As shown in FIG. 17, the base portions 246 are bonded to both the wavy sections 81 and the extending sections 84. Specifically, the base portions 246 are respectively provided over the entire ribs 38 in the extending direction.

As shown in FIG. 18, each protrusion 240 includes a top surface 241, which extends in planar directions of the MEA 10, and two side surfaces 242a, which are bent and respectively extend from opposite ends in the third direction Z of the top surface 241. Each protrusion 240 includes two side surfaces 242b, which are bent and respectively extend from opposite ends of the top surface 241 in the extending direction of the rib 38 (refer to FIG. 20).

A protruding amount H4 of the protrusions 240 is preferably set in the same manner as the protruding amount H1 of the protrusions 40 in the first embodiment (refer to FIG. 3). In the present embodiment, the protruding amount H4 is set to be within the range between 20 µm and 30 µm, inclusive.

An inclination angle θ4 of each side surface 242a with respect to the top surface 241 is preferably set in the same manner as the inclination angle θ1 of each side surface 42a with respect to the top surface 41 according to the first embodiment (refer to FIG. 3). In the present embodiment, the inclination angle θ4 is set to be within the range between 4 degrees and 5 degrees, inclusive.

Figure 20:
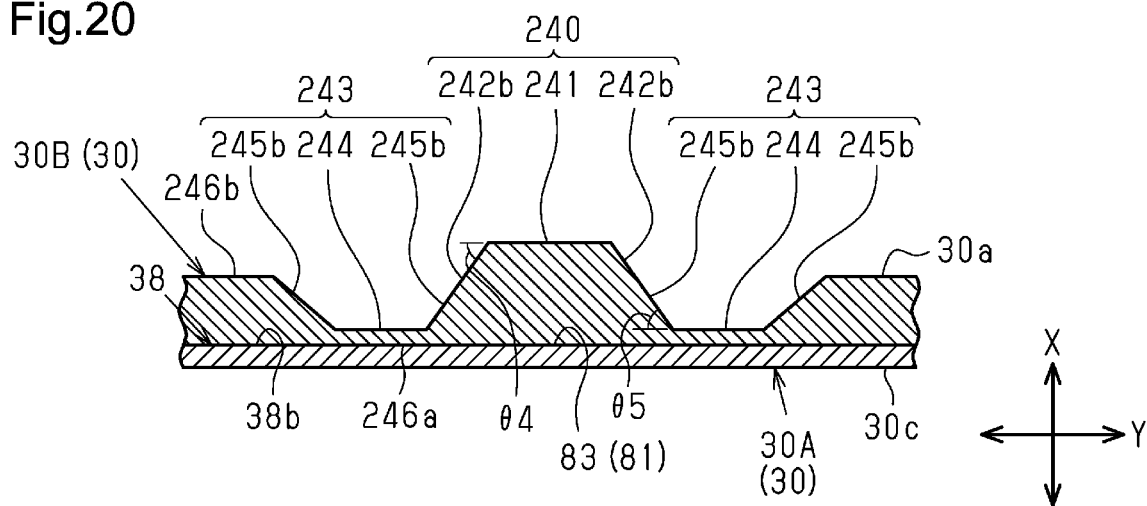
FIG. 20 is a cross-sectional view taken along line 20-20 of FIG. 17.

As shown in FIG. 20, the inclination angle of each inner side surface 245b with respect to the top surface 241 is equal to the inclination angle θ4.

As shown in FIG. 17, each rib 38 includes multiple protrusions 240. Specifically, the protrusions 240 of each rib 38 are provided at multiple positions (four positions in the present embodiment) in the extending direction of the rib 38. Two of the four protrusions 240 are provided in the wavy section 81 of the rib 38. Specifically, the protrusions 240 are respectively provided in positions that correspond to the two narrow sections 83 in the base portion 246. The remaining two protrusions 240 are provided in the extending sections 84 of the rib 38. Specifically, the protrusions 240 are provided in the base portion 246 at positions that respectively correspond to the extending sections 84 that extend to the through-hole 31 and the extending sections 84 that extend to the through-hole 32.

As shown in FIG. 19, each recess 243 includes a bottom surface 244, which extends in planar directions of the MEA 10 and faces the MEA 10, and two inner side surfaces 245*a*, which extend from opposite ends in the third direction Z of the bottom surface 244. Also, each recess 243 includes two inner side surfaces 245*b* in the extending direction of the wavy section 81. The two inner side surfaces 245*b* extend from the bottom surface 244 (refer to FIG. 20).

Each base portion 246 includes general surfaces 246*b*, in which neither the protrusion 240 nor the recess 243 is provided. A protruding amount H5 from the bottom surface 244 to the general surfaces 246*b* is preferably set in the same manner as the protruding amount H2 from the bottom surface 44 of the recess 43 to the general surfaces 38*a* of the rib 38 in the second embodiment (refer to FIG. 8). In the present embodiment, the protruding amount H5 is set to be within the range between 20 μm and 30 μm, inclusive.

An inclination angle θ5 of each inner side surface 245*a* with respect to the bottom surface 244 is preferably set in the same manner as the inclination angle θ2 of each inner side surface 45*a* with respect to the bottom surface 44 according to the second embodiment (refer to FIG. 8). In the present embodiment, the inclination angle θ5 is set to be within the range between 4 degrees and 5 degrees, inclusive.

As shown in FIG. 20, the inclination angle of each inner side surface 245*b* with respect to the bottom surface 244 is equal to the inclination angle θ5.

Each wavy sections 81 includes multiple (four in the present embodiment) recesses 243. Specifically, the recesses 243 in each wavy section 81 are provided at positions that do not overlap with the protrusions 240 in the extending direction of the wavy section 81. More specifically, the recesses 243 are respectively provided on the opposite sides of each protrusion 240 in the extending direction. In the present embodiment, the recesses 243 are arranged such that the inner side surfaces 245*b* are continuous with the side surfaces 242*b* of the protrusions 40.

Operation of the fourth embodiment will now be described.

Figure 21:
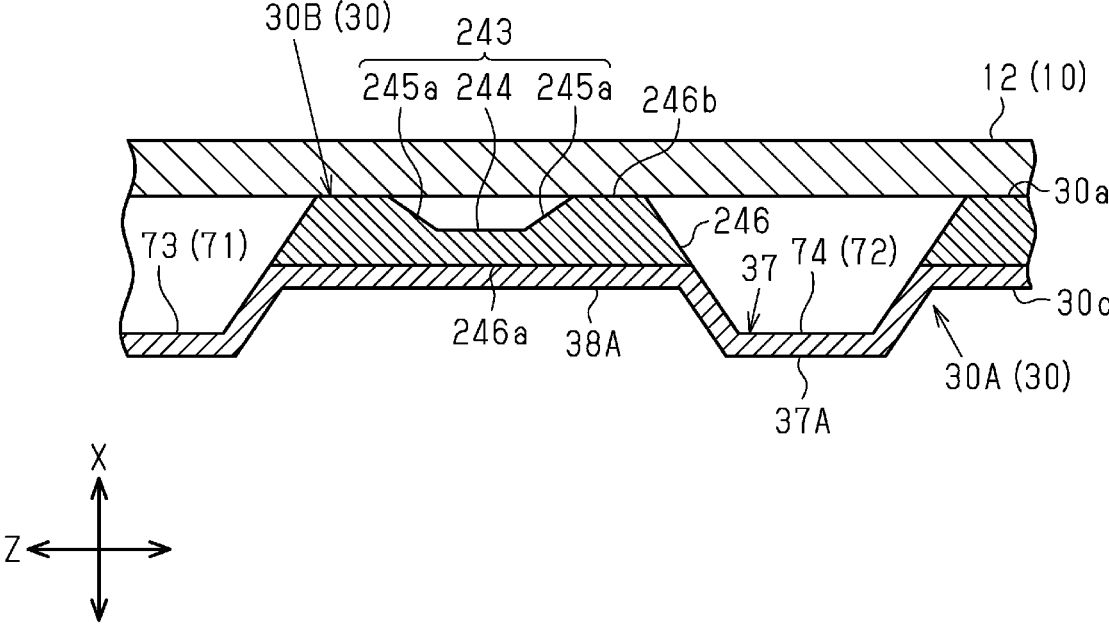
FIG. 21 is a cross-sectional view corresponding to FIG. 4, illustrating the fourth embodiment.
Figure 22:
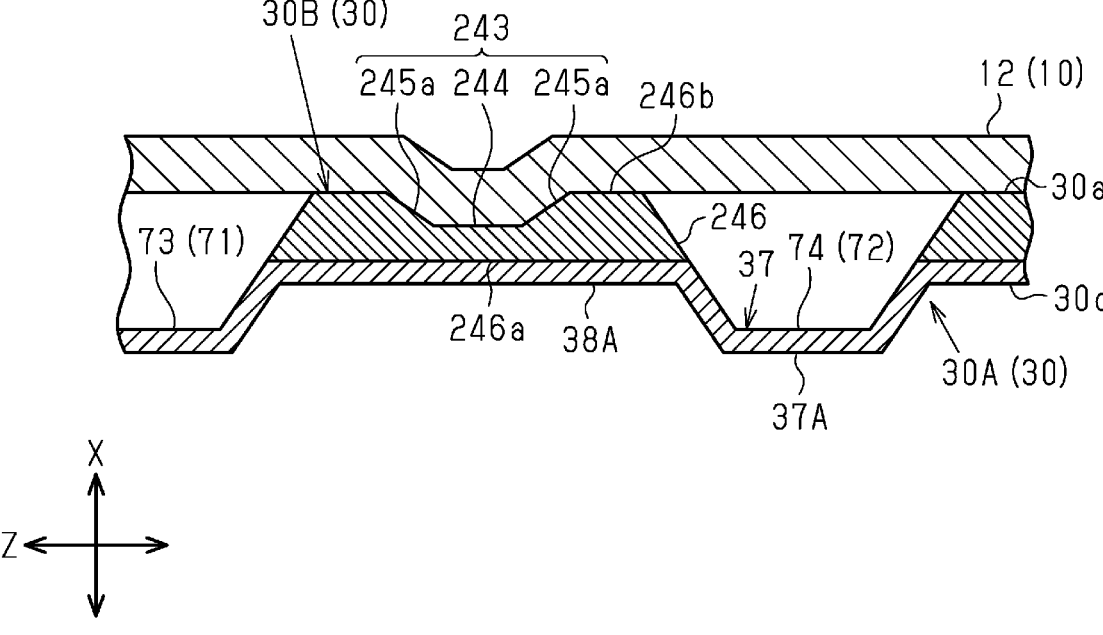
FIG. 22 is a cross-sectional view illustrating a GDL sinking into a recess of a contact member.

As shown in FIGS. 21 and 22, when the separator 30 and the layer including the MEA 10 and the frame member 20 are stacked together to produce the single cell 90 for a fuel cell, the GDL 12 sinks into the recesses 243 along the pairs of the inner side surfaces 245*a* in the inner facing surface 30*a* of the separator 30. Also, the GDL 12 comes into contact with the bottom surfaces 244 of the recesses 243. Although not illustrated, the sections of the GDL 12 that contact the protrusions 240 are compressed (refer to FIGS. 14 and 15) since the protrusions 240 operate in the same manner as the contact members 140 according to the third embodiment. As a result, the sections of the GDL 12 that face the groove passages 37 are in a taut state. FIGS. 21 and 22 illustrate only the GDL 12 in the MEA 10.

The fourth embodiment has the following advantages.

(4-1) The contact members 30B each include the base portion 246, which is joined to the corresponding the rib 38. The protrusions 240 protrudes from the base portions 246.

This configuration operates in the above-described manner. The GDL 12 is thus restricted from sinking into groove passages 37.

Also, since the contact members 30B of the above-described configuration each include the base portion 246, the protruding amount of the rib 38 of the base member 30A is reduced by the protruding amount of the base portion 246. This facilitates the molding of the base member 30A of the separator 30 and thus facilitates the manufacture of the separator 30.

(4-2) Each base portion 246 includes the recess 243 in the center of the base portion 246 in the third direction Z. Each recess 243 includes the bottom surface 244, which extends in planar directions of the MEA 10 and faces the MEA 10, and the two inner side surfaces 245*a*, which extend from the opposite ends in the third direction Z of the bottom surface 244. The two inner side surfaces 245*a* are inclined such that a given point on each inner side surface 245*a* separates further away from the bottom surface 244 in the third direction Z as that point approaches the MEA 10 in the first direction X. The recesses 243 are provided at positions that do not overlap with the protrusions 240 in the extending direction of the ribs 38.

This configuration achieves an advantage similar to the advantage (2-1) of the second embodiment. The GDL 12 is thus further effectively restricted from sinking into groove passages 37.

Modifications

The above-described embodiments may be modified as follows. The above-described embodiments and the following modifications can be combined as long as the combined modifications remain technically consistent with each other.

The shapes of the inlet holes 91, 93, 95 and the outlet holes 92, 94, 96 are not limited to a rectangular shape in plan view as in the above-described embodiments. For example, the shapes of the inlet holes 91, 93, 95 and the outlet holes 92, 94, 96 may be square or stadium-shaped in plan view.

The flows of the reactant gas and the cooling medium through the holes 91, 92, 93, 94, 95, 96 are not limited to those described in the above-described embodiments. For example, the hole 96 may be used as an inlet hole for oxidant gas, and the hole 95 may be used as an outlet hole for the oxidant gas. Accordingly, the hole 94 may be used as an inlet hole for cooling medium, and the hole 93 may be used as the outlet hole for the cooling medium. That is, the oxidant gas that flows through the groove passages 57 and the cooling medium that flows through the groove passages 38A, 58 may flow in the same direction as the fuel gas flowing through the groove passages 37.

The number of the groove passages 37 is not limited to six as described in the above-described embodiments, but may be less than or greater than six.

The width, that is, the cross-sectional flow area of each groove passage 37 does not necessarily need to be constant over the entire groove passage 37 in the extending direction, as long as the operation and the advantages of the present disclosure are achieved.

The separator 30 is not limited to the ones described in the above-described embodiments, which have the structure in which the outermost groove passages 37 in the third direction Z include sections that are located outside the outer edge of the inner facing surface 30a. For example, the groove passages 37 may be located, in the third direction Z, at the same position as or on the inner side of the outer edge of the inner facing surface 30a. Accordingly, the outermost wavy sections 81 of the ribs 38 in the third direction Z may be located inside the outer edge of the inner facing surface 30a.

The recesses 43 are not limited to ones that are arranged such that the inner side surfaces 45b are continuous with the side surfaces 42b of the protrusions 40 as described in the second embodiment. For example, the recesses 43 may be separated from the protrusions 40 in the extending direction of the wavy sections 81.

The recesses 43 are not limited to the ones described in the second embodiment, which are provided on opposite sides of each protrusion 40 in the extending direction of the wavy sections 81. For example, the recesses 43 may be respectively provided on only one of the opposite sides of each protrusion 40 in the extending direction.

The recesses 43 are not limited to the ones described in the second embodiment, which are adjacent to each protrusion 40 in the extending direction of the wavy sections 81. That is, the separator 30 may be configured such that at least three of the recesses 43 are arranged successively in the extending direction of the ribs 38.

The separator 30 is not limited to the one described in the second embodiment, in which the recesses 43 are provided only in the narrow sections 83 in the wavy sections 81 of the ribs 38. That is, the arrangement of the recesses 43 in the separator 30 may be changed. For example, the recesses 43 may be provided in both the narrow sections 83 and the general sections 82 in the wavy sections 81, or may be provided only in the general sections 82. Also, the recesses 43 do not necessarily need to be provided in the wavy sections 81. For example, the recesses 43 may be provided both in the wavy sections 81 and the extending sections 84. Alternatively, the recesses 43 may be provided only in the extending sections 84.

The recesses 43 do not necessarily need to be provided in the ribs 38 as in the second embodiment, but may be provided in at least one of the ribs 38.

The recesses 43 do not necessarily need to be provided at multiple positions in the extending direction of the ribs 38 as described in the second embodiment. That is, the ribs 38 may each be configured to have a recess 43 at least at one section in the extending direction.

The shape of the recesses 43 is not limited to the one described in the second embodiment, but may be changed in the following manner. That is, the recesses 43 do not necessarily need to be shaped such that the bottom surface 44 extends in planar directions of the MEA 10 as described in the second embodiment. For example, the recesses 43 may have a U-shaped cross-sectional shape. Also, the inner side surfaces 45a do not necessarily need to be inclined relative to the bottom surface 44 as described in the second embodiment, but may extend orthogonally from the bottom surface 44.

The ribs 38 according to the third embodiment may be provided with recesses 43. In this case, the recesses 43 may be arranged at positions that do not overlap with the contact members 140 in the extending direction of the ribs 38.

The modifications to the recesses 43 listed above can be applied to the recesses 243 according to the fourth embodiment.

The recesses 243 according to the fourth embodiment may be omitted.

Figure 23:
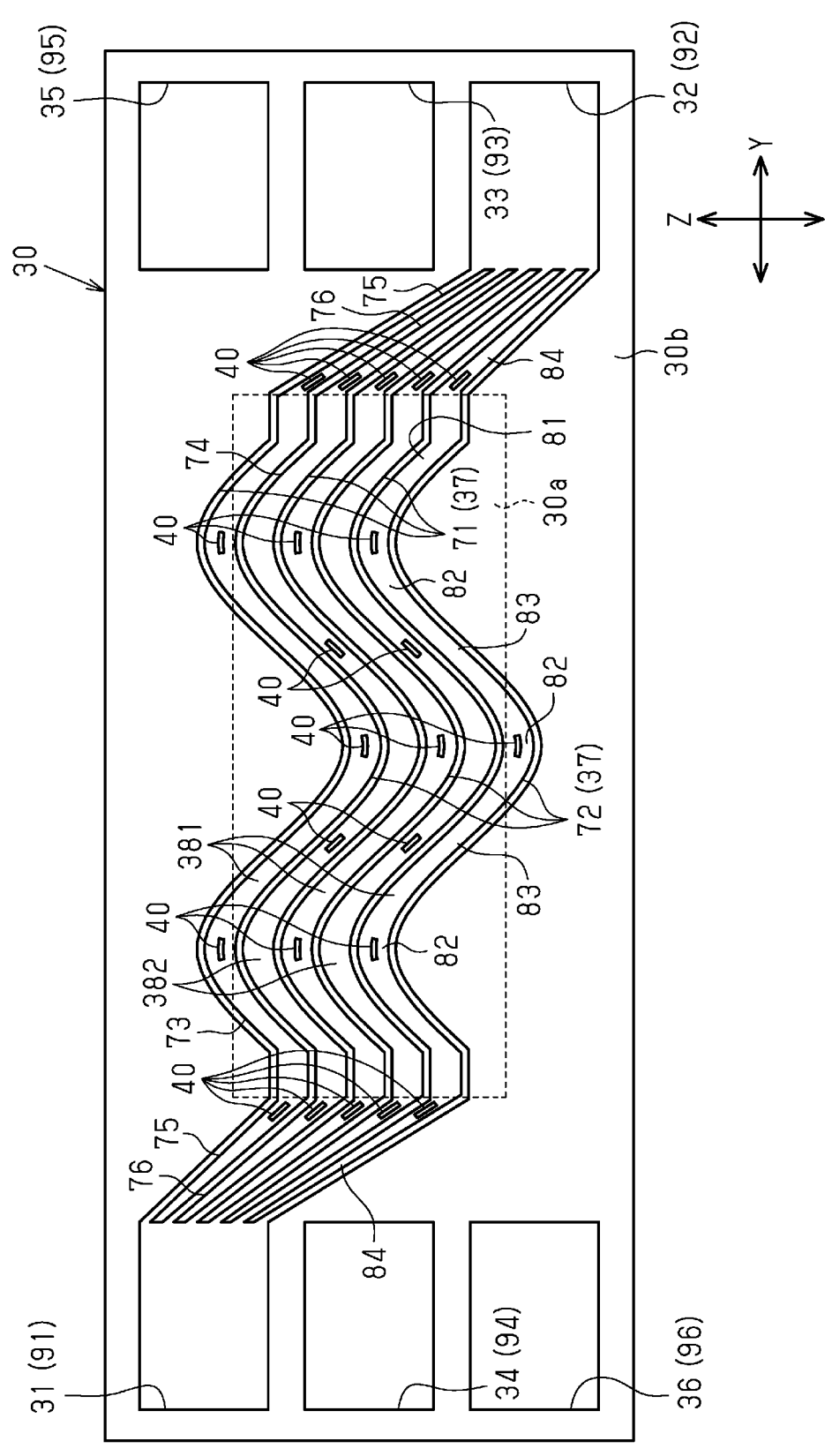
FIG. 23 is a plan view illustrating a separator for a fuel cell according to a modification.

The separator 30 is not limited to the ones described in the first and second embodiments, in which the protrusions 40 provided only in the narrow sections 83 in the wavy sections 81 of the ribs 38. That is, the arrangement of the protrusions 40 in the separator 30 may be changed. For example, the protrusions 40 may be provided in both the narrow sections 83 and the general sections 82 in the wavy sections 81, or may be provided only in the general sections 82. In this case, as shown in FIG. 23, the separator 30 according to the first embodiment may include first ribs 381, in which protrusions 40 are provided only in the general sections 82, and second ribs 382, in which protrusions 40 are provided only in the narrow sections 83. The first ribs 381 and the second ribs 382 are arranged alternately in the third direction Z.

The arrangement of the contact members 140 according to the third embodiment may be changed as in the above-described case of the arrangement of the protrusions 40 in the separator 30.

The arrangement of the protrusions 240 according to the fourth embodiment may be changed as in the above-described case of the arrangement of the protrusions 40 in the separator 30.

The protrusions 40 do not necessarily need to be provided in the ribs 38 as in the first and second embodiments, but may be provided in at least one of the ribs 38.

The contact members 140, 30B of the separators 30 do not necessarily need to be provided in the respective ribs 38 as described in the third and fourth embodiments, but may be provided in at least one of the ribs 38.

Figure 24:
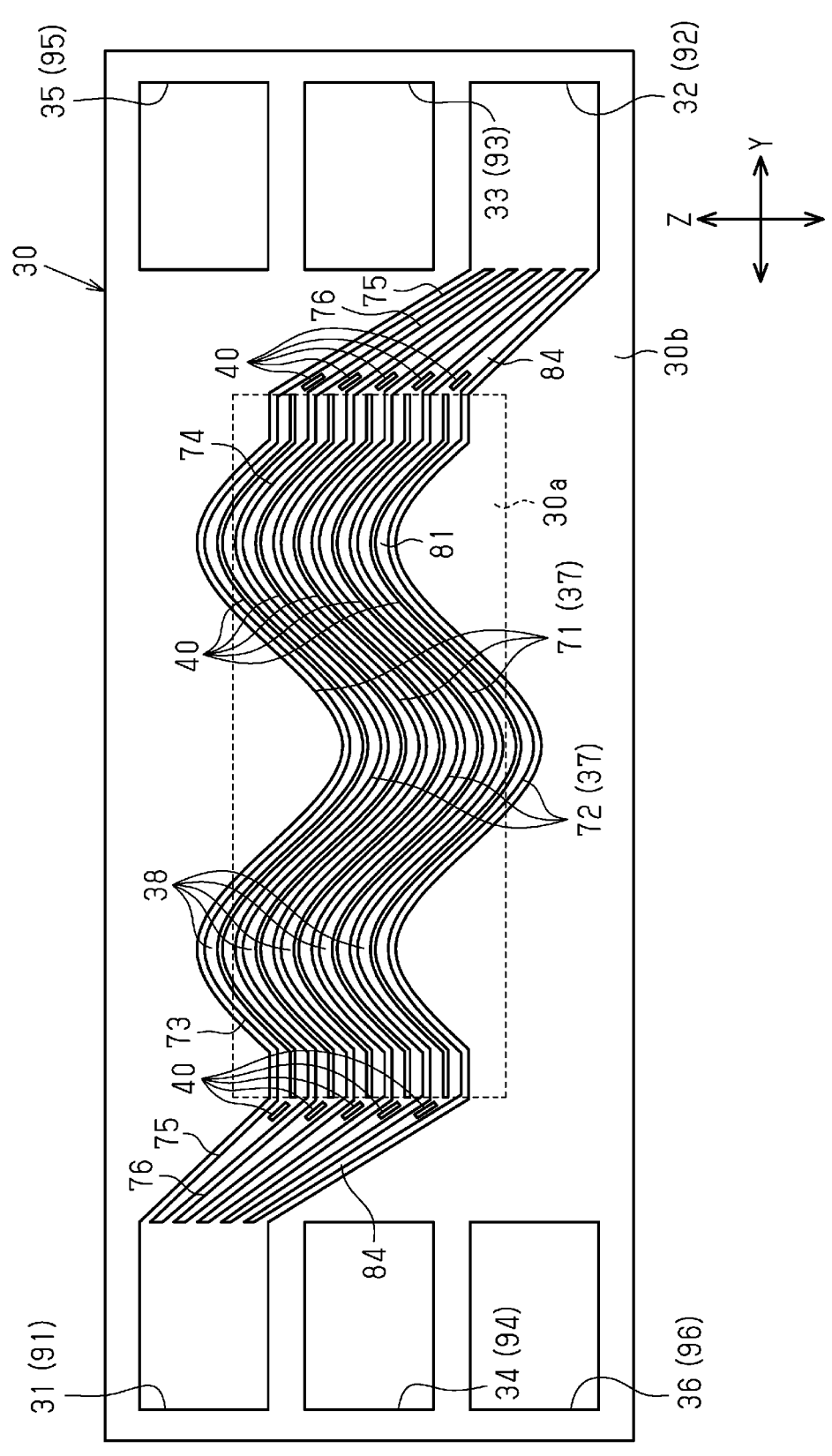
FIG. 24 is a plan view illustrating a separator for a fuel cell according to another modification.

The protrusions 40 do not necessarily need to be provided on the inner facing surface 30a at multiple positions in the extending direction of the ribs 38 as described in the first embodiment. That is, as shown in FIG. 24, the protrusions 40 may be provided over the entire wavy sections 81 in the extending direction. In this case, the protrusions 40 provided in the extending sections 84 may extend from or be independent of the protrusions 40 provided in the wavy sections 81. The protrusions 40 may be omitted from the extending sections 84.

The contact members 140 do not necessarily need to be provided on the inner facing surface 30a at multiple positions in the extending direction of the ribs 38 as described in the third embodiment, but may be modified as in the above-described case of the protrusions 40.

The protrusions 240 of the contact members 30B do not necessarily need to be provided on the inner facing surface 30a at multiple positions in the extending direction of the ribs 38 as described in the fourth embodiment, but may be modified as in the above-described case of the protrusions 40.

The base portions 246 of the contact members 30B do not necessarily need to be provided over the entire ribs 38 in the extending direction as described in the fourth embodiment. That is, the separator 30 may be configured such that the contact members 30B are spaced apart from each other in the extending direction of the ribs 38. The separator 30 does not necessarily need to be configured such that the contact members 30B are bonded to both the wavy sections 81 and the extending sections 84 of the ribs 38. The contact members 30B may be bonded either to the wavy sections 81 or the extending sections 84. In either case, the separator 30 may be modified as long as the protruding amount of a section of each rib 38 in which the contact member 30B is not provided is increased by the protruding amount of the base portion 246 of the contact member 30B. In this case, at least one of the protrusion 40 and the recess 43 may be provided in this section.

The shape of the protrusions 40 may be modified in the following manner. The protrusions 40 do not necessarily need to be shaped such that the top surface 41 extends in planar directions of the MEA 10. For example, the protrusions 40 may have an inverted U-shaped cross-sectional shape. Also, the side surfaces 42a do not necessarily need to be inclined relative to the top surface 41, but may extend orthogonally from the top surface 41.

The shape of the contact members 140 is not limited to the one described in the third embodiment, but may be changed as in the above-described case of the protrusions 40.

The shape of the protrusions 240 of the contact members 30B is not limited to the one described in the fourth embodiment, but may be changed as in the above-described case of the protrusions 40.

The groove passages 37 do not necessarily include the first groove passages 71 and the second groove passages 72. For example, as long as the groove passages 37 include at least one first groove passage 71 and at least one second groove passage 72 that are adjacent to each other, the groove passages 37 may include an additional groove passage different from the first groove passage 71 or the second groove passage 72.

The second groove passages 72 are not limited to the ones described in the above-described embodiments, in which the wavy sections 74 have the same waveform as the wavy sections 73 of the first groove passages 71. That is, the wavelength λ, the amplitude A, and the wavenumber of the wavy sections 74 may be different from those of the wavy sections 73. In this case, the narrow sections 83 of the ribs 38 do not necessarily need to be located between the apex V1 and the apex V2 and between the apex V2 and the apex V3 of the wavy sections 81 as described in the above-described embodiments.

The shape of the first groove passages 71 is not limited to the ones described in the above-described embodiments. That is, the first groove passages 71 are not limited to the ones in which the wavelength λ and the amplitude A of the wavy sections 73 are constant over the entire wavy sections 73 in the extending direction. For example, three waves of each wavy section 73 may have different wavelengths λ and different amplitudes A.

The wavenumber of the wavy sections 73 is not limited to three as described in the above-described embodiments, but may be less than or greater than three.

The shape of the groove passages 37 is not limited to the ones described in the above-described embodiments, but may be changed in the following manner. That is, the groove passages 37 do not necessarily need to include the first groove passages 71 and the second groove passages 72, which extend in wavy shapes in planar directions of the inner facing surface 30a. For example, each groove passage 37 may be changed to extend linearly in planar directions of the inner facing surface 30a.

The contact members 140, 30B do not necessarily need to be bonded to the ribs 38 with an adhesive as described in the third and fourth embodiments. For example, the contact members 140 (30B) and the base member 30A may be subjected to hot pressing to join the contact members 140 (30B) to the ribs 38.

The binder contained in the conductive material of the contact members 140, 30B is not limited to an epoxy resin shown in the third and fourth embodiments, but may be, for example, a phenol resin. Also, the binder is not limited to a thermosetting resin, but may be a thermoplastic resin such as polypropylene, polyamide, or polyphenylene sulfide.

The contact members 140 (contact members 30B) may be integrally molded with the ribs 38 by inserting the base member 30A into the molding die and performing injection molding.

The base member 30A of the separator 30 does not necessarily need to be formed by pressing a metal member, but may be formed by cutting or etching. The separators 30 according to the first and second embodiments may be molded in the same manner.

The material for the base member 30A of the separator 30 is not limited to titanium or stainless steel, but may be aluminum or carbon. The same materials may be used to form the separators 30 according to the first and second embodiments.

The separator for a fuel cell according to the present disclosure is not limited to the separator 30, which is joined to the side of the MEA 10 that corresponds to the anode 11B as in the above-described embodiments, but may be employed in the separator 50, which is joined to the side corresponding to the cathode 11A.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A separator for a fuel cell, the separator including a facing surface configured to face a power generating unit of the fuel cell, groove passages through which a reactant gas flows being arranged side by side on the facing surface, wherein a direction in which the groove passages are arranged side by side is defined as an arrangement direction, ribs, which are located between the groove passages and protrude toward the power generating unit, are provided on the facing surface, and at least one of the ribs includes at least one protrusion that protrudes toward the power generating unit, and wherein the protrusion includes:

a top surface that extends in a planar direction of the power generating unit; and two side surfaces that are bent and respectively extend from opposite ends of the top surface in the arrangement direction of the groove passages, and the two side surfaces are inclined such that a given point on each side surface separates further away from the top surface in the arrangement direction as that point separates away from the power generating unit in a facing direction in which the power generating unit and the separator face each other.

2. The separator for the fuel cell according to claim 1, wherein a protruding amount of the protrusion is within a range between 10 μm and 30 μm, inclusive, and an inclination angle of each side surface relative to the top surface is within a range between 1 degree and 5 degrees, inclusive.

3. The separator for the fuel cell according to claim 1, wherein the at least one protrusion of the rib includes protrusions, and the protrusions are provided on the facing surface at multiple positions in an extending direction of the rib.

4. The separator for the fuel cell according to claim 1, wherein each rib includes the at least one protrusion.

5. The separator for the fuel cell according to claim 1, wherein the power generating unit is held by a frame member that is located at an outer periphery of the power generating unit, the facing surface includes an inner facing surface, the separator for the fuel cell includes an outer facing surface that faces the frame member, the groove passages each include an extending section that extends into the outer facing surface, the ribs each include an extending section that extends into the outer facing surface, and the at least one protrusion of the rib includes a protrusion provided in the extending section of the rib.

6. The separator for the fuel cell according to claim 1, further comprising:

a base member that includes the groove passages and the ribs; and a contact member that is joined to the base member and contacts the power generating unit, wherein the protrusion is formed by the contact member.

7. The separator for the fuel cell according to claim 6, wherein the contact member includes a base portion that is joined to the rib, and the protrusion protrudes from the base portion.

8. The separator for the fuel cell according to claim 7, wherein the base portion includes a recess in a center of the base portion in the arrangement direction of the groove passages, the recess includes:

a bottom surface that extends in a planar direction of the power generating unit and faces the power generating unit; and two inner side surfaces that extend from opposite ends in the arrangement direction of the bottom surface, the two inner side surfaces are inclined such that a given point on each inner side surface separates further away from the bottom surface in the arrangement direction as that point approaches the power generating unit in a facing direction in which the power generating unit and the separator face each other, and the recess is provided at a position that does not overlap with the protrusion in an extending direction of the rib.

9. A single cell for a fuel cell, comprising:

two separators; and a power generating unit that is held between the two separators and includes two gas diffusion layers respectively contacting the two separators, wherein at least one of the two separators is the separator according to claim 8, and the power generating unit is compressed by the protrusion in the facing direction and sinks into the recess.

10. A single cell for a fuel cell, comprising:

two separators; and a power generating unit that is held between the two separators and includes two gas diffusion layers respectively contacting the two separators, wherein at least one of the two separators is the separator according to claim 1, and the power generating unit is compressed by the protrusion in a facing direction in which the power generating unit and the separator face each other.

11. A separator for a fuel cell, the separator including a facing surface configured to face a power generating unit of the fuel cell, groove passages through which a reactant gas flows being arranged side by side on the facing surface, wherein a direction in which the groove passages are arranged side by side is defined as an arrangement direction, ribs, which are located between the groove passages and protrude toward the power generating unit, are provided on the facing surface, and at least one of the ribs includes at least one protrusion that protrudes toward the power generating unit, and wherein the rib includes a recess in a center of the rib in the arrangement direction of the groove passages, the recess includes:

a bottom surface that extends in a planar direction of the power generating unit and faces the power generating unit; and two inner side surfaces that extend from opposite ends in the arrangement direction of the bottom surface, the two inner side surfaces are inclined such that a given point on each inner side surface separates further away from the bottom surface in the arrangement direction as that point approaches the power generating unit in a facing direction in which the power generating unit and the separator face each other, and the recess is provided at a position that does not overlap with the protrusion in an extending direction of the rib.

12. A single cell for a fuel cell, comprising:

two separators; and a power generating unit that is held between the two separators and includes two gas diffusion layers respectively contacting the two separators, wherein at least one of the two separators is the separator according to claim 11, and the power generating unit is compressed by the protrusion in the facing direction and sinks into the recess.

* * * * *